US012729158B2

(12) United States Patent
Mcalpine et al.

(10) Patent No.: US 12,729,158 B2
(45) Date of Patent: Sep. 8, 2026

(54) CRYSTALLINE CELLULOSE REINFORCED CEMENT

(71) Applicant: NANO-GREEN BIOREFINERIES INC., Saskatoon (CA)

(72) Inventors: Sean Mcalpine, Saskatoon (CA); Jory Nakoneshny, Saskatoon (CA); Blaine Kunkel, Saskatoon (CA)

( * ) Notice: Subject to any disclaimer, the term of this patent is extended or adjusted under 35 U.S.C. 154(b) by 0 days.

(21) Appl. No.: 18/664,020

(22) Filed: May 14, 2024

(65) Prior Publication Data

US 2024/0336526 A1 Oct. 10, 2024

Related U.S. Application Data

(63) Continuation of application No. 16/564,875, filed on Sep. 9, 2019, now Pat. No. 12,017,955.

(60) Provisional application No. 62/728,246, filed on Sep. 7, 2018.

(51) Int. Cl.

| | |
|---|---|
| ***A47B 43/00*** | (2006.01) |
| ***C04B 18/26*** | (2006.01) |
| ***C04B 24/38*** | (2006.01) |
| ***C04B 28/02*** | (2006.01) |
| ***C04B 28/04*** | (2006.01) |
| ***D21C 9/04*** | (2006.01) |
| ***D21C 9/10*** | (2006.01) |
| ***D21C 9/12*** | (2006.01) |
| ***D21C 9/16*** | (2006.01) |
| *C04B 103/30* | (2006.01) |
| *C04B 103/32* | (2006.01) |
| *D21C 9/00* | (2006.01) |

(52) U.S. Cl.

CPC .......... *C04B 18/265* (2013.01); *C04B 24/383* (2013.01); *C04B 28/02* (2013.01); *C04B 28/04* (2013.01); *D21C 9/10* (2013.01); *D21C 9/12* (2013.01); *D21C 9/163* (2013.01); *C04B 2103/304* (2013.01); *C04B 2103/32* (2013.01); *D21C 9/002* (2013.01); *D21C 9/007* (2013.01); *D21C 9/1063* (2013.01)

(58) Field of Classification Search

CPC ..... C04B 18/265; C04B 24/383; C04B 28/02; C04B 28/04; C04B 2103/304; C04B 2103/32; C04B 18/26; C04B 14/06; C04B 40/0028; C04B 20/023; D21C 9/10; D21C 9/12; D21C 9/163; D21C 9/002; D21C 9/007; D21C 9/1063

See application file for complete search history.

(56) References Cited

U.S. PATENT DOCUMENTS

| | | | |
|---|---|---|---|
| 5,547,024 | A | 8/1996 | Di Lullo Arias |
| 7,744,690 | B2 | 6/2010 | Durst et al. |
| 9,388,251 | B2 | 7/2016 | Olkowski et al. |
| 2005/0269048 | A1 | 12/2005 | Rodriguez et al. |
| 2008/0066652 | A1 | 3/2008 | Fraser et al. |
| 2009/0229494 | A1 | 9/2009 | Shah et al. |
| 2010/0162926 | A1 | 7/2010 | Thomson et al. |
| 2011/0198543 | A1 | 8/2011 | Tarumoto et al. |
| 2012/0227633 | A1 | 9/2012 | Laukkanen et al. |
| 2013/0000523 | A1 | 1/2013 | Weerawarna et al. |
| 2013/0196883 | A1 | 8/2013 | Rincon-Torres et al. |
| 2013/0274149 | A1 | 10/2013 | Lafitte et al. |
| 2016/0073310 | A1 | 3/2016 | Hapsari et al. |
| 2016/0075601 | A1* | 3/2016 | Youngblood ....... C04B 40/0067 106/805 |
| 2016/0347661 | A1 | 12/2016 | Youngblood et al. |
| 2017/0088705 | A1* | 3/2017 | Lapidot .................. C04B 28/18 |
| 2018/0148630 | A1 | 5/2018 | Yakovlev et al. |

FOREIGN PATENT DOCUMENTS

| | | | |
|---|---|---|---|
| CA | 2912190 | 11/2014 | |
| EP | 1900703 | 3/2008 | |
| EP | 2572698 | 3/2013 | |
| WO | 2017127938 | 8/2017 | |
| WO | WO-2017127938 A1 * | 8/2017 | ............ C08B 15/02 |

OTHER PUBLICATIONS

Pediaa. [Retrieved on Sep. 17, 2021 from <U RL:https://pediaa.com/difference-between-plasticizer-and-superplasticizer/>]. Copyright 2017 (Year: 2017).

Nevell TP, Singh OP. Effect of Manganese (II), Cobalt (II), and Copper (I) Hydroxides on the Kinetics of the Oxidation of Cellulose by Hypochlorite. Textile Research Journal. 1986;56(4):270-280. doi: 10.1177/004051758605600407 (Year: 1986).

Shenai VA, Prasad RB. Studies in Accelerated Oxidation of Cellulose: Part II: Tendering Behavior of Cobaltous Hydroxide. Textile Research Journal. 1972;42(10):603-604. doi: 10.1177/004051757204201012 (Year: 1972).

Park et al. Cellulose crystallinity index: measurement techniques and their impact on interpreting cellulase performance, Biotechnol Biofuels. 2010, 3:10).

International Search Report of the ISA/US dated Sep. 16, 2014; Application No. PCT/US14/37576 filed May 9, 2014; Publication No. W02014/183082A1 dated Nov. 13, 2014.

Written Opinion of the ISA/US dated 9/46/2014; Application No. PCT/US14/37576 filed May 9, 2014; Publication No. W02014/183082A1 dated Nov. 13, 2014.

Process for generating nanocrystalline cellulose fragments (NCC) (Klemm et al., 2011).

Bai W, Holbery J, Li K. (2009) Cellulose. 16, 455.

* cited by examiner

*Primary Examiner* — Marites A Guino-O Uzzle
(74) *Attorney, Agent, or Firm* — Bennett Jones LLP

(57) ABSTRACT

A cementitious composition comprises cement and crystalline cellulose or nanocrystalline cellulose formed from a cellulosic material by a redox reaction.

17 Claims, 21 Drawing Sheets

CRYSTALLINE CELLULOSE REINFORCED CEMENT

CROSS-REFERENCE TO RELATED APPLICATION

This application is a continuation of U.S. patent application Ser. No. 16/564,875, filed on Sep. 9, 2019, which itself claims priority to U.S. provisional application Ser. No. 62/728,246 filed on Sep. 7, 2018. The entire contents of these applications are hereby incorporated by reference.

FIELD OF THE INVENTION

The present invention relates to cement comprising crystalline cellulose formed by oxidative methods.

BACKGROUND

Nanoparticulate cellulose and crystalline cellulose can improve mechanical performance of cementitious compositions, as the small size allows for reduced interfiber spacing, and more interactions between cellulose and the cement system; as a result, the nano-sized particles have a greater potential to alter micro-cracking and can therefore increase the strength of the system. Cellulose nanocrystals (CNCs) have been investigated as cellulosic reinforcement for cementitious material. CNCs derived from renewable resources may be advantageous because of their renewability, sustainability, low toxicity, and the potential to be processed at industrial scale quantities at low cost. CNCs are rod-like nanoparticles (typically 50 nm to 500 nm in length and 3-5 nm in width and 3-20 nm in height (having a square or rectangular cross-section)), and they are about 50-90% crystalline. They can be obtained by extraction from lignocellulosic material followed by chemical processing.

CNCs exhibit high axial stiffness (~150 GPa), high tensile strength (estimated at 7.5 GPa), low coefficient of thermal expansion (~1 ppm/K), thermal stability up to ~300° C., high aspect ratio (10-100), low density (~1.6 g/cm3), lyotropic liquid crystalline behavior, and shear thinning rheology in CNC suspensions. The exposed hydroxyl side groups on CNC surfaces can be readily modified to achieve different surface properties, which modifications can be used to adjust CNC self-assembly and dispersion within a wide range of suspensions and matrix polymers, and to control interfacial properties in composites (e.g. CNC-CNC and CNC-matrix).

This unique set of characteristics results in new capabilities compared to more traditional cellulose-based particles (wood flake, pulp fibers, etc.), allowing for the development of new advanced composites that take advantage of the CNCs' enhanced mechanical properties, low defects, higher surface area to volume ratio, and engineered surface chemistries.

Microcrystalline cellulose (MCC) is a valuable biopolymer used in the food and pharmaceutical sectors and in industrial applications such as in oil, gas and mining. The predominant industrial process for generating MCC is acid hydrolysis, where highly pure cellulose such as dissolving grade alpha cellulose or Kraft pulp is digested with a strong mineral acid, followed by a physical size reduction. Digestion with hydrochloric or sulfuric acid removes amorphous domains within cellulose fibrils, leaving fragments of cellulose fibrils with high crystallinity. The predominant production process for MCC using acid hydrolysis is expensive due to high capital and operating costs, and the use of corrosive mineral acids is problematic with respect to safety and environment. In addition, the tight control requirements of sulfuric acid concentration and temperature makes it necessary to use dried pulp as the biomass source.

Production of CNC is similar to that of MCC production, consisting of digestion with a strong mineral acid (such as 64% sulfuric acid), followed by mechanical size reduction (Klemm et al., 2011). Diverse parent materials can be used but wood pulp is predominant. CNC fragments (also known as whiskers, nanowhiskers or nanocrystalline cellulose) are generated with variable sizes being reported (widths from 5 to 70 nm and lengths from 100 to about 1000 nm).

Physical properties of CNC are strongly influenced by source of parent material, the type of acid used in digest (hydrochloric or sulfuric), charge and dimensions. Several mechanical size reduction processes can be used following acid digestion, such as ultrasonic treatment, cryogenic crushing and grinding, and homogenization such as fluidization, which may also increase yield. CNC may also be generated from MCC using strong mineral acid hydrolysis followed by separation by differential centrifugation, which results in a narrow size distribution of the CNC (Bai et al., 2009). The use of strong mineral acid hydrolysis for the production of CNC either from biomass sources or from MCC encounters the same economic, environmental and safety limitations as for the production of MCC.

It is known to include CNC produced by acid hydrolysis into cement to improve its properties. It is believed that the incorporation of such CNC may result in an increased degree of hydration and cumulative heat evolution.

However, there remains a need in the art for alternative or improved cementitious compositions using crystalline cellulose. This background information is provided solely to facilitate understanding of the invention described below, and is not an admission of prior art or relevancy to the claimed invention.

SUMMARY OF THE INVENTION

In one aspect, and in general terms, the invention may comprise a cement composition comprising cement and crystalline cellulose which has been formed by a redox reaction. Preferably, the redox reaction comprises oxidation of a cellulose material with a persulfate, a hypohalite or hydrogen peroxide. Preferably, the crystalline cellulose is nanocrystalline cellulose. Preferably, the crystalline cellulose or nanocrystalline cellulose is treated with an alkaline solution prior to combination with cement.

In another aspect, the invention may comprise a cement composition comprising cement and nanocrystalline cellulose treated in an alkaline solution, which cellulose is preferably prepared with a redox reaction.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF PREFERRED EMBODIMENTS

Figure 1A:
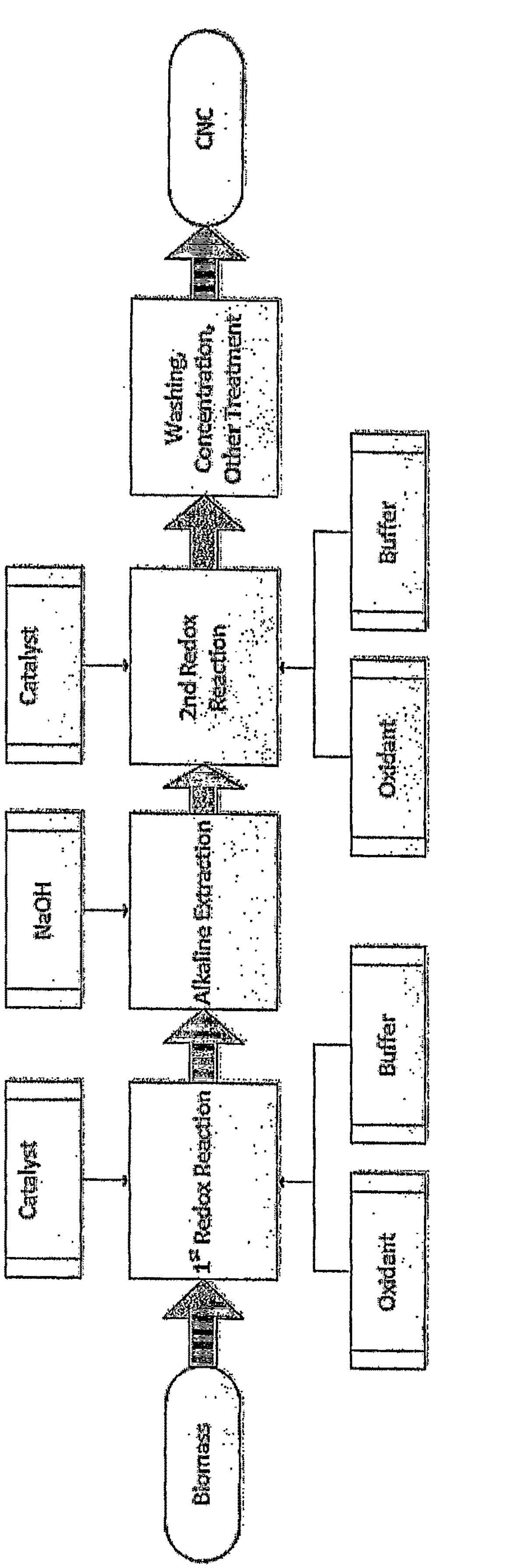
FIG. 1A is a schematic representation of one method of producing CNC by an oxidative method.

The present invention relates to cement comprising crystalline cellulose formed from a cellulosic material by an oxidative method comprising at least one redox reaction.

In this description, "cellulosic material" refers to any material which comprises a substantial proportion of cellulose, and may include lignocellulosic biomass and purified forms of cellulose. Lignocellulosic biomass includes, but is not limited to, agricultural crops, residues and by-products from processing, such as wheat straw, flax straw, hemp straw, chaff, grasses, hay, grains and meals, oat hulls, rice hulls, corn stover, corn husks, sugarcane bagasse, weeds, aquatic plants, hay, cotton waste, animal or human waste; forestry products, residues and by-products from processing wood, including hardwood or softwood, wood pulp, Kraft pulp, thermomechanical or chemi-thermomechanical pulp, Kraft brown pulp, pulping waste and byproducts such as Kraft brown pulp shives, paper products and paper waste, damaged wood such as Mountain Pine Beetle damaged wood; and peat. Purified forms of cellulose may include alpha-cellulose or dissolving grade pulp.

The primary constituents of lignocellulosic biomass are lignin, hemicellulose and cellulose. Cellulose is a polysaccharide comprising D-glucose units in linear and branched chains. The linear chains are ordered in a parallel structure in crystalline regions, however, there are para-crystalline and amorphous regions which lack such order and structure. The amorphous regions are more susceptible to acid hydrolysis, and thus crystalline cellulose is conventionally produced by acid hydrolysis to digest and remove the amorphous regions. Crystalline cellulose comprises cellulose where at least a portion of the amorphous cellulose present in the cellulosic material has been removed, leaving a greater proportion of the cellulose in crystalline form.

Crystalline cellulose may be recovered as either microcrystalline cellulose, or as cellulose nanocrystals, or a mixture comprising both. As used herein, microcrystalline cellulose or MCC comprises crystalline cellulose particles having at least one dimension greater than about 1 micron but less than about 1 mm, and preferably less than about 500 microns, or 300 microns. MCC particles may be elongated and have a diameter less than 1 micron but have a length much greater than 1 micron.

Cellulose nanocrystals or CNCs are particles comprising crystalline cellulose where all relevant dimensions are less than about 1 micron. CNC particles are typically long, high aspect ratio crystals, having a diameter less than about 50 nm, and a length greater than about 100 nm. In one preferred embodiment, CNC has an average length of about 100 nm to about 150 nm and an average diameter of about 10 nm. CNCs typically have a much higher aspect ratio than MCC, in the range of about 10 to about 70. In this description, the terms "cellulose nanocrystals" (CNCs) and "nanocrystalline cellulose" (NCC) may be used interchangeably.

In one embodiment, the invention comprises cement combined with MCC or CNC, or a mixture of MCC and CNC, produced from a cellulosic material by an oxidative method comprising at least one redox reaction. An exemplary oxidative method is shown schematically in FIG. 1A. The primary steps of the process comprise a first redox reaction, followed by an alkaline extraction and a second redox reaction. The resulting material may be washed, concentrated and/or mechanically treated. As used herein, a "redox reaction" is a reaction where one species is oxidized while another is reduced. In one example, an inorganic persulfate or a hypohalite is reduced as it oxidizes the cellulosic material. In another example, the redox reaction comprises hydrogen peroxide chemistry which may involve modified Fenton or Haber Weiss reactions, and a transition metal catalyst, such as the method described in U.S. Pat. No. 9,388,251, the entire contents of which are incorporated by reference.

Without restriction to a theory, it is believed that crystalline cellulose produced by a redox reaction has surface chemistry different from crystalline cellulose produced by acid hydrolysis, and that the different surface chemistry may provide advantages when used in cementitious compositions. It is believed that when cellulose is oxidized, many carboxyl groups are formed on the sugar carbon atoms. Conversely, when cellulose is acid hydrolyzed, such as with sulphuric acid, fewer carboxyl groups are formed, and many sulphate half esters are formed. Thus, crystalline cellulose formed by oxidation has a weaker negative surface charge and includes weaker surface acid groups.

In one embodiment, the crystalline cellulose is cellulose having a crystallinity index (CI) which is at least about 10% greater, and preferably at least 20%, 25% or 30% greater than the CI of the cellulosic material prior to the reaction, wherein the CI is measured by any suitable method, provided that the same method is used in each case. In one embodiment, the crystalline cellulose has a CI of at least about 50%, and preferably greater than about 60, 70, 80 or 90%. Crystallinity index may be measured by X-ray diffraction using a peak height method, a peak deconvolution method, an amorphous subtraction method, or an NMR method. (Park et al. Cellulose crystallinity index: measurement techniques and their impact on interpreting cellulase performance, Biotechnol Biofuels. 2010; 3: 10).

CI measurements using a peak height method typically result in a CI higher than with other methods. Table 1 below shows the crystallinity index of several known cellulosic materials and commercial MCC products, using the various methods described above.

TABLE 1

| | XRD method | | | NMR |
|---|---|---|---|---|
| Cellulose tested | Peak height | Peak de-convolution | Amorphous sub-traction | method C4 peak separation |
| BMCC | 95.2 | 73.1 | 82.4 | 73.8 |
| Avicel PH-101* | 91.7 ± 1.5 | 60.6 ± 1.0 | 77.7 ± 1.9 | 56.7 ± 2.2 |
| SigmaCell 50 | 91.2 | 61.3 | 79.4 | 56.1 |
| SigmaCell 20 | 84.8 | 64.2 | 67.0 | 52.6 |
| JT Baker cellulose | 85.5 | 61.5 | 69.1 | 49.1 |
| Fluka cellulose | 82.9 | 52.9 | 61.6 | 48.6 |
| SolkaFloc cellulose | 78.3 | 56.8 | 57.2 | 43.9 |
| Sigma α-cellulose | 78.0 | 55.9 | 54.4 | 41.5 |

BMCC, bacterial microcrystalline cellulose.
Values are means.

In one embodiment, the redox reaction involves a method of processing a cellulosic material, which may be in dried form, hydrated, or as an aqueous suspension, using a hypohalite salt and a transition metal catalyst to produce crystalline cellulose, preferably substantially pure CNC. As used herein, "substantially pure CNC" means that less than 50%, 40%, 30%, 20% or 10% (wt.) of the resulting crystalline cellulose is not CNC. One method of determining homogeneity of CNC is to determine particle size distribution. Substantially pure CNC typically will demonstrate a single peak below about 1 micron, with few particles (less than 10% by weight) greater than 1 micron in size.

In one embodiment, the catalyst is combined with a hypohalite salt and the cellulosic material feedstock, to promote reactions where the cellulosic material is depolymerized and fractionated, and where amorphous cellulose may be digested. The remaining cellulose may be recovered as a solid fraction while degraded lignin and hemicellulose fractions remain in solution. After a single redox reaction, the cellulose fraction may comprise high-quality cellulose, which may include a large proportion of crystalline cellulose. In one preferred embodiment, and particularly after a second redox reaction, the recovered cellulose comprises cellulose nanocrystals (CNC), which may be substantially pure, and of relatively homogenous size. For example, the recovered CNC may have a single peak of size distribution, where the average particle size is less than about 300 nm, or 200 nm, or 100 nm. Suitable methods are described in U.S. patent application Ser. No. 16/073,310, the entire contents of which are incorporated herein by reference.

Particle size and distribution may be measured by any known technique. In one embodiment, dynamic light scattering or quasi-elastic light scattering is used to measure particle size and distribution.

In one embodiment, the process may be applied to lignocellulosic biomass feedstock to produce a cellulosic material which is at least about 80% or 90% (by weight) cellulose. This cellulosic material may then be used to produce crystalline cellulose. Alternatively, the process may be applied to a cellulosic material comprising a purified form of cellulose produced by an oxidative step, or any other means, such as Kraft pulp, dissolving pulp, alpha cellulose, or MCC. In one embodiment, the method may be used to treat MCC to reduce its average particle size or to produce CNC particles, or a crystalline cellulose with increased CNC content.

The cellulosic material is preferably finely divided and may be suspended in a water slurry, which may comprise about 1% to 15% (w/v) of dry weight of cellulosic material, preferably between about 2% to about 10%. The cellulosic material should then be agitated until dispersed and substantially hydrated.

If the redox reaction involves hypohalite, it may be added as a salt, to achieve a concentration of 0.05M to about 1.0M, preferably between about 0.10M to about 0.5M. The amount of hypohalite may be adjusted to the amount of cellulosic material and/or the purity of the cellulosic material, and may be in the range of about 1 mol chlorine per kg of cellulosic material to about 10 mol/kg (dry weight) in one reaction. If the reaction is repeated, then the total amount of chlorine applied may be between about 2 to about 20 mol/kg. In one preferred embodiment, the hypohalite comprise sodium hypochlorite, which is commercially available in trade concentrations ranging from about 3% to about 20% (w:v). A trade concentration of 8% has a specific gravity of about 1.11, about 7.2% available chlorine, and 7.6% weight percent NaOCl. A trade concentration of 12% has a specific gravity of about 1.17, about 10.4% available chlorine, and comprises about 10.9% weight percent NaOCl.

Figure 1B:
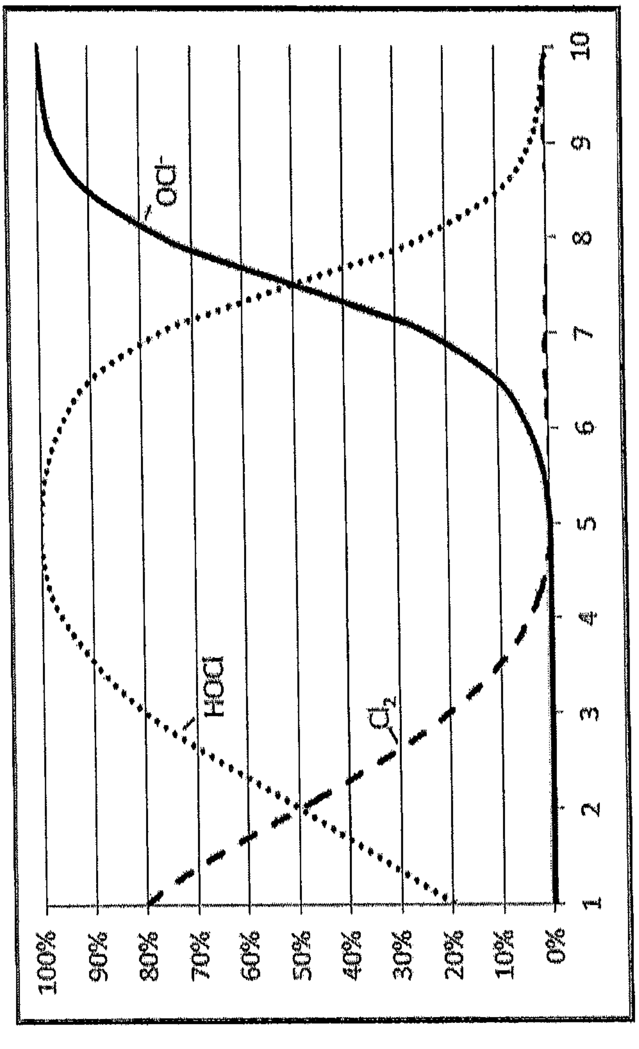
FIG. 1B is a graph showing pH driven equilibrium of chlorine, hypochlorous acid and hypochlorite.

Chlorine is soluble in water to about 7000 ppm at 20° C. and reacts with water forming hypochlorous acid (HOCl). In alkali solutions, hypochlorous acid dissociates, forming hypochlorite (OCl—). Chlorine, hypochlorous acid and hypochlorite exist together in equilibrium, which equilibrium is pH sensitive, as shown in FIG. 1B.

In one embodiment, the transition metal catalyst may comprise any suitable transition metal, such as iron, copper, manganese, molybdenum, rhodium or cobalt. The catalyst may be provided as a salt dissolved in solution, or may be provided on an insoluble solid support. The transition metal catalyst may comprise ferric ($Fe^{3+}$), cupric ($Cu^{2+}$) ions or manganous ($Mn^{2+}$), such as ferric sulphate ($Fe_2(SO_4)_3$), cupric sulphate ($CuSO_4$), or manganous sulphate ($Mn_2SO_4$), and may be added to achieve a minimum concentration of about 0.01 mM. The catalyst preferably has a concentration between about 0.045 mM to 0.67 mM. The ratio of transition metal ion to cellulosic material may be in the range of about 0.1 mg/g to about 5 mg/g, and preferably between about 0.2 mg/g to about 1.0 mg/g.

In one embodiment, the transition metal catalyst may be chelated with a chelating agent, such as EDTA or a polyvalent organic acid, such as citric acid. In some embodiments, iron and manganese catalysts appear to perform better with a chelating agent, while copper catalysts appear to work well without it.

In one embodiment, the treatment solution is optionally prepared with an aqueous buffer to maintain the pH as the hypohalite is consumed, preferably between about 4.0 and 8.0, and more preferably between about 6.0 to about 8.0. Because hypohalite solutions have a pH greater than about 12, the initial pH of the reaction mixture may be greater than 7.0, and in the range of between about 10 to about 12. As the hypohalite is reduced, and acidic byproducts of the reaction are produced, the pH will gradually be reduced to below 9.0, preferably below about 8.0 and more preferably below about 7.0. However, it is preferable to ensure that the pH does not drop to less than about 4.0, to avoid the possibility of halogen gas generation. Accordingly, the buffer may control the pH of the mixture as the hypohalite is reduced. In one embodiment, the buffer may comprise a phosphate buffer such as trisodium phosphate and an organic acid, which may preferably be a polyvalent carboxylic acid such as citric acid. In some embodiments, a hydroxide may be added to the reaction, either initially or gradually as the reaction continues, in order to prevent the terminal reaction pH from dropping below a desired value.

The rate of the reaction is at least partially temperature dependent. The temperature may range from about room temperature to about 95° C. It is not desirable to exceed 100° C., and the reaction proceeds quite slowly at room temperature. Therefore, in one embodiment, the temperature may be between about 50° and 95° C., and preferably between about 65° C. to about 85° C.

The length of the reaction will depend, at least in part, on the reaction rate and the original amount of the hypohalite. As hypohalite is consumed by the reaction and disappears, the ORP of the reaction mixture will rapidly decrease. In aqueous solutions, oxidation-reduction potential (ORP) is a measure of the tendency of the solution to either gain or lose electrons when it is subject to change by introduction of a new species. A solution with a higher ORP than the new species will have a tendency to gain electrons from the new species (i.e. to be reduced by oxidizing the new species) and a solution with a lower (more negative) reduction potential will have a tendency to lose electrons to the new species (i.e. to be oxidized by reducing the new species). ORP values of aqueous solutions are determined by measuring the potential difference between an inert sensing electrode in contact with the solution and a stable reference electrode connected to the solution by a salt bridge The initial ORP may be about +500 to about +1000 mV, and will increase slightly but stay in that range as the reaction proceeds. Once the hypohalite has been consumed, the ORP will drop rapidly to about 0.0 or a negative value. At this point, additional hypohalite may be added to continue the reaction if desired.

Figure 2:
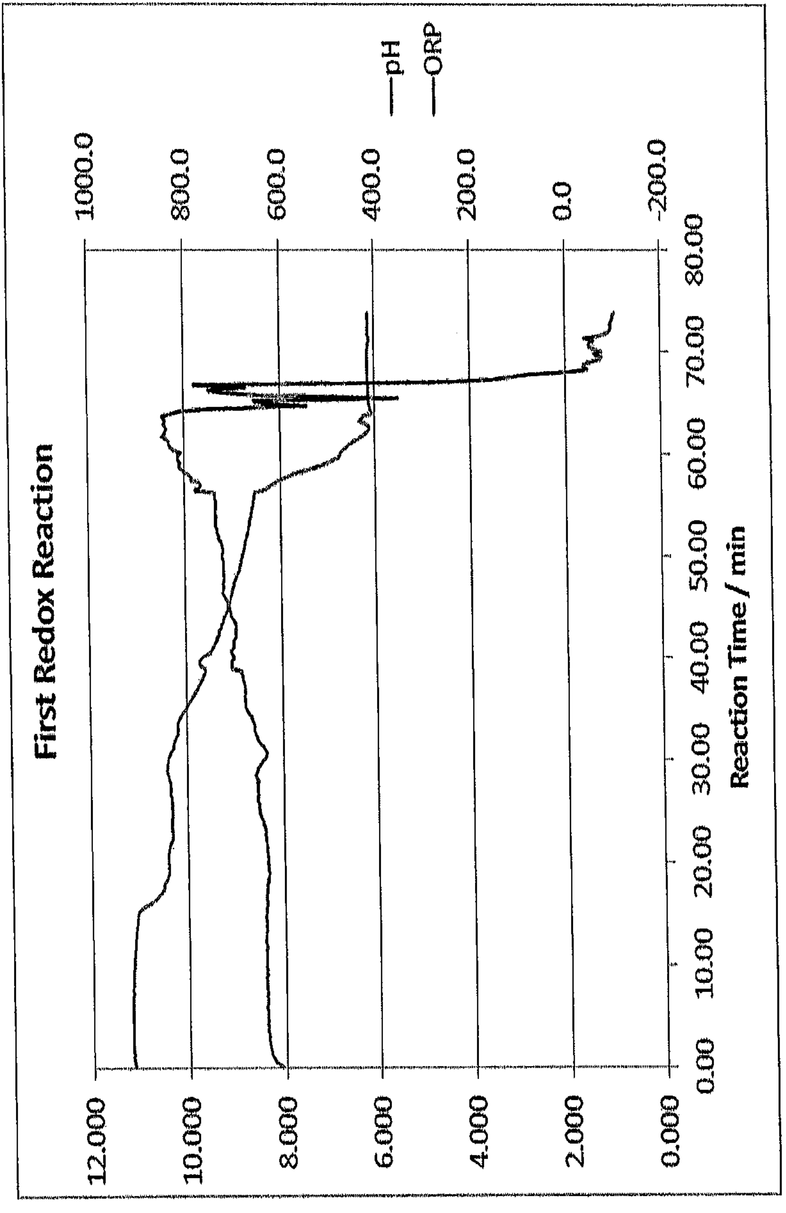
FIG. 2 shows a graph plotting pH and oxidation-reduction potential (ORP) during a redox reaction of the present invention.
Figure 4:
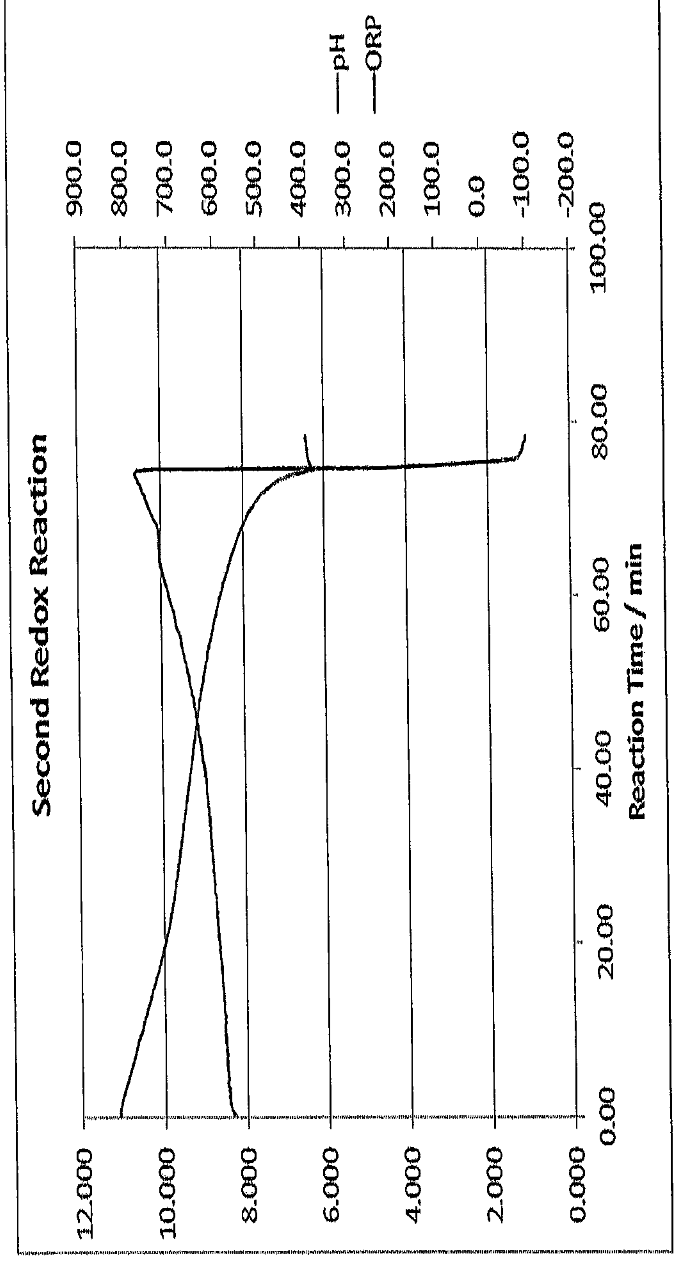
FIG. 4 shows a graph plotting pH and oxidation-reduction potential (ORP) during a second redox reaction of the present invention, after a first redox reaction and an alkaline extraction.

As shown in FIGS. 2 and 4, one feature of the present invention is the reaction phase where ORP has remained the same or increases slightly, while pH is slowly decreasing. In one embodiment, the endpoint of the reaction is marked by a sudden and large drop in ORP and stabilization of the pH below about 9.0, and preferably between about 6.0 and 6.5.

Once the first redox reaction has proceeded, the cellulose fraction remains as a solid, while the lignin and hemicellulose fractions have largely dissolved in the aqueous slurry. Some portion of the amorphous domains may also have been solubilized. Thus, the solid cellulose fraction may be separated by any suitable means, such as centrifugation or filtration, while the lignin and hemicellulose fractions remain in solution or in the filtrate. The cellulose fraction may then be washed and harvested.

In one embodiment, removing oxidation products of the redox reaction may result in a more complete reaction and better quality crystalline cellulose product. Therefore, in one embodiment, the filter cake from the first redox reaction may be resuspended in water and NaOH added to achieve a pH of about 12.0. The mixture may then be stirred, with optional heating between about 50° and 95° C., and preferably between about 65° C. to about 85° C., until the pH stabilizes at about 10.0 or below. The lowering of the pH may be caused by organic acids dissolving or releasing into the alkaline suspension and neutralizing hydroxide ions. The colour of the liquid will change from a yellowish orange to a dark brown. After the alkaline extraction, the suspension may be filtered and washed with water.

In one embodiment, the redox reaction process may be continued for a sufficient length of time, or repeated, to yield crystalline cellulose of a desired particle size or range of size. The length of time, number of repetitions and severity of the reaction conditions may be selected by one skilled in the art having regard to the quality or character of the cellulosic feedstock and of the desired product, and of economic factors. In general, the longer the reaction process, the greater the number of repetitions, and the more severe reaction conditions, will result in crystalline cellulose of smaller dimensions and/or of greater purity. The minimum length of time for any given set of reaction conditions may be determined by one skilled in the art by empirically sampling the reaction products and determining if the desired crystalline cellulose particles have formed. The appearance and/or quality of crystalline cellulose particles may easily be detected by particle size analysis, microscopic imaging and/or measuring the crystallinity index.

In one embodiment, and in particular after a single redox reaction, the crystalline cellulose may comprise granular MCC having an average particle size in the range of about 20 to 50 microns, similar to pharmaceutical grade MCC. This product may be further processed by suspension in water to produce a colloidal suspension, and allowing a larger fraction comprising primarily of MCC to settle and form a sediment on the bottom of the vessel. A fraction of smaller particles may remain in suspension and comprises crystalline cellulose having smaller dimensions, and may also comprise CNC.

Granular MCC may also be further processed using physical, physico-chemical, or chemical size reduction treatment, resulting in a mixture of colloidal microcrystalline cellulose having an average particle size between about 10 to 20 microns, and CNC. For example, MCC may be treated with ultrasound (sonication), microfluidized, blended, homogenized, ground or refined, or otherwise treated to reduce particle size. The colloidal cellulose fraction comprises high purity crystals with microscopic morphology substantially similar to the morphology of analytical grade microcrystalline cellulose, and may also include CNC.

If granular MCC is treated by a second redox reaction, the product becomes substantially pure CNC. Quality of the CNC product may be assessed on the following factors in Table 2:

TABLE 2

| Measurement | Good Quality | Poor Quality |
| --- | --- | --- |
| Cake on filter paper | Feels either rubbery or greasy | Feels soft or fibrous |
| Microscope image 10 X | Very small visible particles. No particles after sonication | Visible fibres several microns in length |
| Visible appearance of gel or suspension | Clear or almost clear. Evidence of Rayleigh scattering. Sample goes clear with ultrasound | Opaque gel, white or off white. Remains opaque after ultrasound treatment |
| Size by DLS* | One size peak at around 100 nm. $Z_{ave}$ 100-200 nm | Two size peaks. One at 800 nm to 1,500 nm. $Z_{ave}$ > 300 nm |

TABLE 2-continued

| Measurement | Good Quality | Poor Quality |
|---|---|---|
| Zeta Potential | Below −30 mV | Higher than −30 mV in association with settling particles |

Other measurements which may be made on the product include measurement of amount of carboxyl content on the surface of the CNC, by a conductimetric titration with hydrochloric acid and sodium hydroxide. Units are in mmol/g. The carboxyl content and conductivity may provide a measure for product purity.

The product of the second redox reaction may also be subjected to an alkaline wash, such as by being resuspended in water and adding NaOH added to a pH of about 12.0. The mixture may then be stirred, with optional heating between about 50° and 95° C., and preferably between about 65° C. to about 85° C.

Without restriction to a theory, it is believed that the alkaline wash helps solubilize and remove mono-, di- and oligosaccharides which are associated with the CNC crystals. In some embodiments, the alkaline wash of CNC may improve the properties of a cementitious composition including CNCs from sources other than CNC produced by an oxidative process, such as acid-hydrolyzed CNCs. In addition to solubilizing and removing mono-, di- and oligosaccharides, the alkaline wash may neutralize surface acid groups.

Cementitious Compositions

In one embodiment, the oxidized CNC product can be added, in various loadings, to a cement composition comprising water and cement powder, with various optional components well known in the art, including fine or coarse aggregate, an air entrainer admixture, plasticizers, superplasticizers, or other additives. The use of oxidized CNC product may offer several advantages compared to a corresponding composition comprising CNC conventionally produced by acid hydrolysis.

Embodiments of the invention may provide an improved degree of hydration (DOH) due to increased effectiveness of the CNC product in the presence of a superplasticizer. Some embodiments of the present invention may provide increased tensile and compressive strength of a concrete composition including such CNC. Some embodiments may provide increased set time of such a concrete composition.

As described above, the invention provides cement paste compositions that include cement and CNCs, or concrete comprising such a cement paste composition. The cement paste can also include various amounts of water, which result in improved cement compositions upon curing. The CNCs can be present in an amount of at least about 0.04 volume %, up to about 5 volume % or about 10 volume %, for example, to provide cement pastes with low viscosity. However, the cement pastes preferably include less than about 5 volume %, less than about 4 volume %, less than about 3 volume %, less than about 2 volume %, or less than about 1 volume %, to increase flexural strength. In some embodiments, maximal increases in flexural strength are found upon addition of CNCs at about 0.1 to about 0.5 volume %.

To optimize the properties of the compositions, the CNCs are substantially evenly dispersed throughout the cement. The distribution can be enhanced by sonication, such as ultrasonication, to further increase the dispersion of the CNCs throughout the cement component.

In various embodiments, the CNCs are present in an amount of about 0.1 volume % to about 1 volume %, about 0.15 volume % to about 0.5 volume %, about 0.15 volume % to about 0.3 volume %, about 0.15 volume % to about 0.25 volume %, or about 0.15 volume % to about 0.25 volume %. In one specific embodiment, the CNCs are present in an amount of about 0.2 volume %, ±20% of the value to account for variability in measurements. By incorporating CNCs into a cement paste, the cement paste composition has a reduced yield point and increased plasticization and workability.

In some embodiments, the oxidatively produced CNCs may be used as additives for the improved performance of cement paste compositions and the resulting cured cement pastes. The cement paste compositions can be used to provide compositions such as concrete, self-compacting concrete, mortar, or grout. The surface of the CNCs can be modified (e.g., with alkyl groups, carboxyalkyl groups, alkylsulfonic acid groups, phosphate groups, sulfate groups, or the like) to provide CNCs with modified properties as discussed above, that can be used in the compositions and methods described herein.

To prepare the cement pastes, any suitable cement can be used. A wide variety of cements can be used to provide suitable and effective cement pastes with improved physical properties, as described herein. Other suitable types of cement include Portland cement, energetically modified cement made from pozzolanic minerals, and Portland cement blends such as Portland blastfurnace cement, Portland flyash cement, Portland pozzolan cement, Portland silica fume cement, masonry cements, plastic cements, stucco cements, expansive cements, white blended cements, colored cements or "blended hydraulic cements", very finely ground cements, Pozzolan-lime cements, slag-lime cements, supersulfated cements, calcium sulfoaluminate cements, natural cements, geopolymer cements, and green cements.

In some embodiments, specific examples of cement-based materials that can be used include aluminous cement, blast furnace cement, calcium aluminate cement, Type I Portland cement, Type IA Portland cement, Type II Portland cement, Type IIA Portland cement, Type III Portland cement, Type IIIA, Type IV Portland cement, Type V Portland cement, hydraulic cement such as white cement, gray cement, blended hydraulic cement, Type IS-Portland blastfurnace slag cement, Type IP and Type P-Portland-pozzolan cement, Type S-slag cement, Type I (PMY) pozzolan modified Portland cement, and Type I (SM)-slag modified Portland cement, Type GU-blended hydraulic cement, Type HE-high-early-strength cement, Type MS-moderate sulfate resistant cement, Type HS-high sulfate resistant cement, Type MH-moderate heat of hydration cement, Type LH-low heat of hydration cement, Type K expansive cement, Type O expansive cement, Type M expansive cement, Type S expansive cement, regulated set cement, very high early strength cement, high iron cement, oil-well cement, concrete fiber cement deposits, or a composite material including any one or more of the above listed cements. The different types of cement can be characterized by The American Society for Testing and Materials (ASTM) Specification C-150.

Suitable cements may also be classified or characterized by API Classes A, B, C, G or H, as published in API Specification 10A.

Cement-based material prepared from the cement pastes described herein can include other components or fillers as known by those skilled in the art, such as those used to form various types of concretes. For example, the cement-based material can optionally include aggregates, air-entraining agents, retarding agents, accelerating agents such as catalysts, plasticizers, superplasticizers, corrosion inhibitors, alkali-silica reactivity reduction agents, bonding agents, colorants, and the like. "Aggregates" as used herein, unless otherwise stated, refer to granular materials such as sand, gravel, crushed stone or silica fume. Other examples of aggregate materials include recycled concrete, crushed slag, crushed iron ore, or expanded (i.e., heat-treated) clay, shale, or slate.

Examples—The following examples are intended to illustrate aspects of the claimed invention, but not be limiting in any manner, unless explicitly recited as a limitation.

Example 1—First Redox Reaction

In one example, a first redox reaction was performed using sodium hypochlorite under the following conditions with one of A96 (96% alpha cellulose), Kraft bleached pulp, brown Kraft pulp (never dried), treated hemp pulp (Pure Lignin Environmental Technology—as described in US Patent Application 20050269048 A1). The catalyst was either ferric sulphate or cupric sulphate, either chelated or non-chelated, added as a 53.7 mmol/L solution:

TABLE 3

| First Redox Reaction | |
|---|---|
| Reaction Volume | 1 L |
| Biomass | 20 oven dried g of biomass |
| Biomass pretreatment | Soaking in reverse osmosis water |
| Catalyst added | 3.9 mL (0.209 mmol/L of iron sulfate or copper sulfate) |
| NaClO added | 90 mL of 8.5% or 60 mL of 12% sodium hypochlorite solution (0.1132 moles) |
| Buffer Added | 40 mL (1.0 L of buffer solution is prepared by dissolving 41.9 g of Trisodium Phosphate and 10.93 g of citric acid into reverse osmosis water.) |
| Reaction time | Hold until a rapid drop in ORP |
| Reaction Temperature | 75° C. |
| Control measurements | pH, ORP |

In this example, 5.65 mol NaOCl per kg of biomass is used. 60 mL of 12% NaOCl having a specific gravity of 1.19 is used, wherein the molecular weight of NaOCl is 74.44 g/mol.

FIG. 2 shows the reaction progress over time. As the reaction progresses, pH decreases while ORP increases slightly until the hypochlorite is completely consumed, at which point the ORP decreases rapidly to zero.

The ratios of sodium hypochlorite, copper catalyst and biomass in the first and second redox reaction are provided below in Table 4.

TABLE 4

| Reaction Ratios | | |
|---|---|---|
| Ratios | First Redox | Second Redox |
| Oxidant/Cu | 549.4 | 549.4 mol/mol |
| Oxidant/Biomass | 428.4 | 428.4 mg/g |
| Cu/Biomass | 0.66 | 0.66 mg/g |

At the end of the first redox reaction, the biomass has substantially broken down compared to the start. This is visible as seen by the reduction in suspension viscosity as well as shortening of individual fibres as seen by ordinary light microscopy.

After the first redox reaction, the suspension is vacuum filtered with 5 μm size filter paper. When the suspension is almost dry, an additional 500 mL of reverse osmosis (RO) water is added and filtered through the resulting cake.

Example 2—Alkaline Extraction

Figure 3:
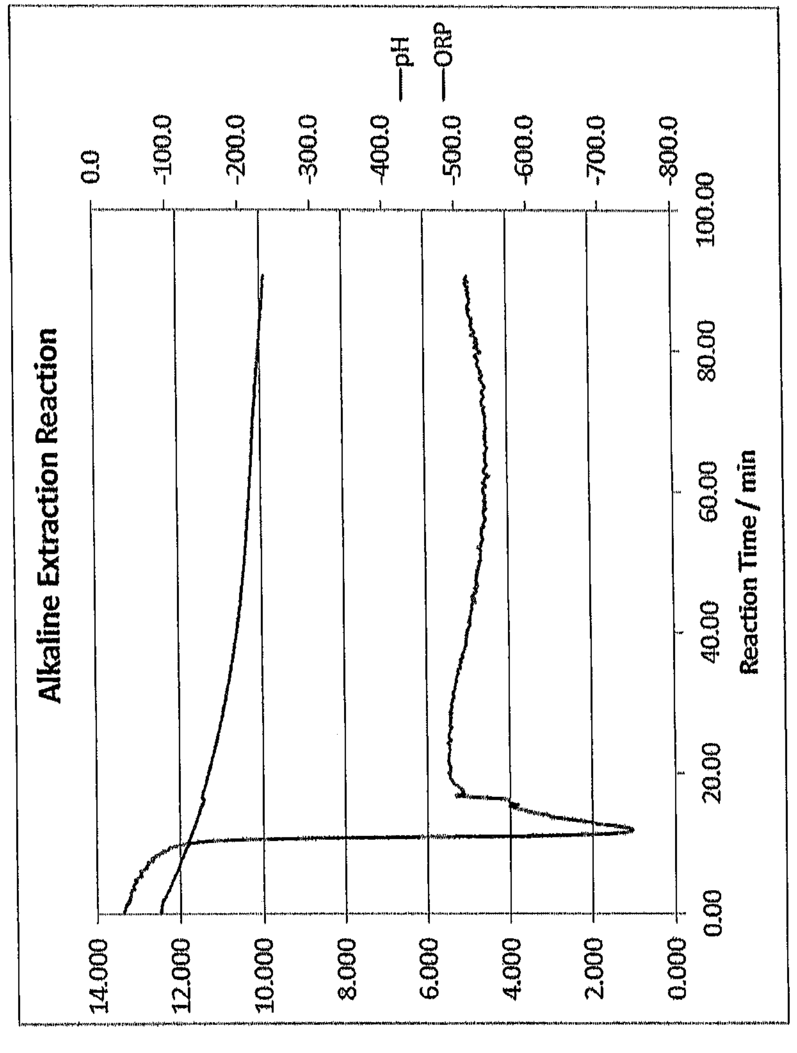
FIG. 3 shows a graph plotting pH and oxidation-reduction potential (ORP) during an alkaline extraction reaction.

In one embodiment, removing oxidation products of the first redox reaction may result in a more complete reaction and better quality crystalline cellulose product. The filter cake from the first redox reaction was resuspended in 1 L of water and NaOH added to a pH of 12.0-12.3. The mixture was then stirred at 85° C. for 1.5 hours, or until the pH goes below about 10.0. The lowering of the pH is caused by organic acids dissolving in the alkaline suspension and reacting with the dissolved hydroxide ions. Reaction conditions over time are shown in FIG. 3. After the pH stabilizes below about 10.0 and the ORP stabilizes at about −500 mV, the suspension is vacuum filtered with 5 μm size filter paper. When the suspension is almost dry, an additional 500 mL of RO water is added and filtered through the resulting cake.

Example 3—Second Redox

The second redox is similar to the conditions set out in the first redox. The cake (approximately 16 dry grams) from the alkaline extraction step is resuspended in water and subjected to the following treatment.

TABLE 5

| Second Redox Reaction | |
|---|---|
| Reaction Parameter | Description |
| Reaction Volume | 1 L |
| Catalyst added | 3.9 mL (0.089 mmol of copper sulfate) |
| NaClO added | 90 mL of 8.5% or 60 mL of 12% (0.1132 moles) |
| Buffer Added | 40 mL |
| Reaction time | Hold until a rapid drop in ORP (approximately 80 minutes) |
| Reaction Temperature | 75° C. |
| Control measurements | pH, ORP |

Figure 5A:
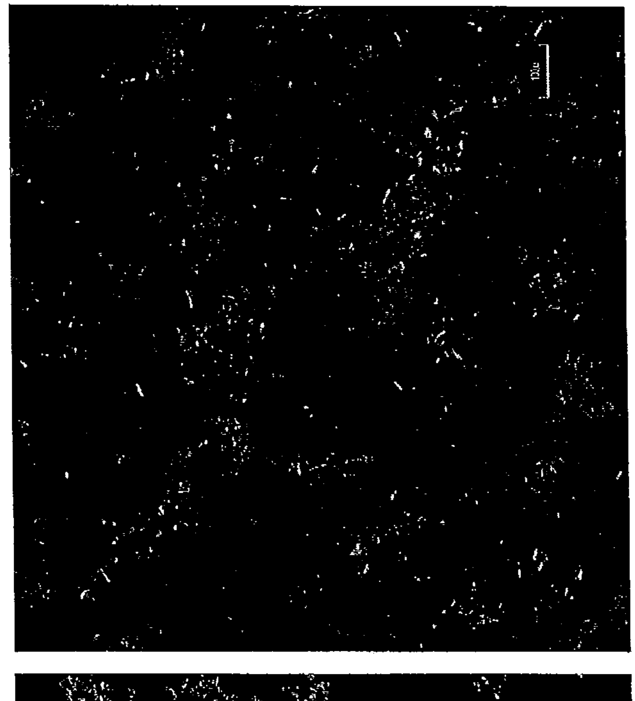
FIG. 5A shows photomicrographs of cellulosic material before (left) and after (right) a second redox reaction.
Figure 5A:
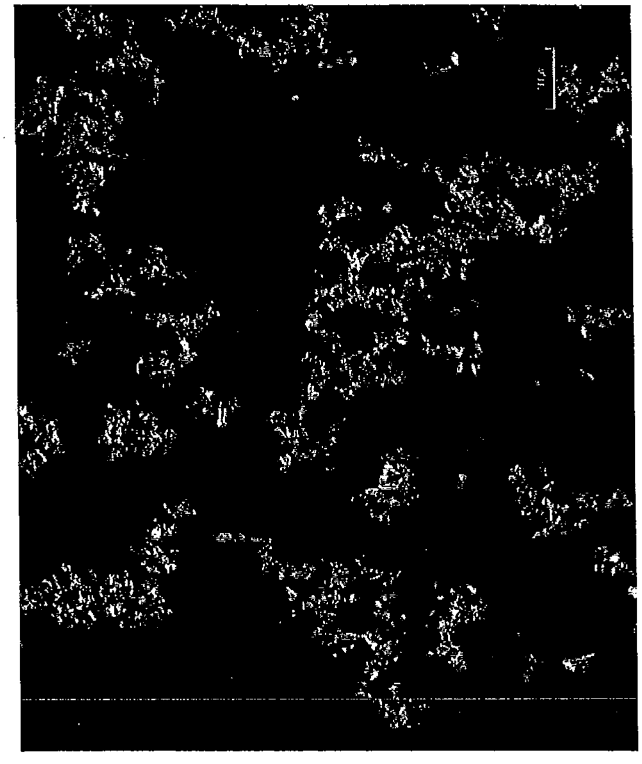

FIG. 5A shows photomicrographs of the reaction contents before (left) and after (right) the second redox reaction. After the reaction, the cellulosic material has lost its original fibre size and shape and CNC particles are observable with DLS. The larger particles are likely agglomerations of CNC, which may be broken up by sonication or other processing.

Example 4—Washing, Dewatering and Other Material Handling

The CNCs in suspension resulting from the second redox reaction has dissolved salts and organic oxidation products that are preferably removed. Suspension conductivity may be used to measure washing effectiveness. The CNC is washed until the suspension conductivity (at 1% w/w CNC) goes below about 50 μS/cm. The CNCs may still be slightly agglomerated at this point, so a brief treatment with ultrasound (Hielscher model UIP1000hd, 100% amplitude, 5-10 s) may be used to break up these agglomerates.

The following table shows product testing results and comments of selected batches of crystalline cellulose product produced by two rounds of redox reactions, with an alkaline extraction after the first. Results from dynamic light scattering using a Malvern Instruments Zetasizer Nano ZS™ show CNC particles having an average particle size of under about 450 nm, with a zeta potential of about −38.0 mV. Zeta potential is a measurement of electrical potential amongst colloidal particles and their interaction with the dispersing media. It is used as an indication of the stability of a colloidal dispersion. Low values (near zero) suggest the particles may coagulate and/or settle. High absolute values, for example greater than +30 mV, indicate good electrical stability of the colloid.

TABLE 6

Selected Results of Redox Treatments of different biomasses - Examples 1, 2 and 3

| Trial | Biomass | Treatment | Results |
|---|---|---|---|
| 1 | Acetate Grade Dissolving Pulp (A96) | Iron catalyst, Citric acid chelation | 212 nm average particle size. |
| 2 | A96 | Iron catalyst, EDTA chelation | 336 nm average particle size. Iron precipitate on filter paper. |
| 3 | A96 | Copper catalyst | 208 nm average particle size. Transparent after sonication |
| 4 | Bleached Kraft | Copper catalyst with citric acid chelation. TSP Buffer | 96.98 nm average particle size, Zeta potential 40.1 mV |
| 5 | Brown Kraft, never dried | Copper catalyst | 223 nm average particle size. Transparent after sonication |
| 6 | Hemp pulp, partially treated, never dried (Pure Lignin ™) | Copper catalyst | Average particle size 450 nm before sonication. 97 nm after sonication. Samples showed distinct thixotropic behaviour |
| | A96 | TSP citrate buffer, copper sulfate catalyst, 750 L pilot scale run | 311 nm average particle size before sonication, 89 nm after 15 second ultrasound treatment. |

Figure 5B:
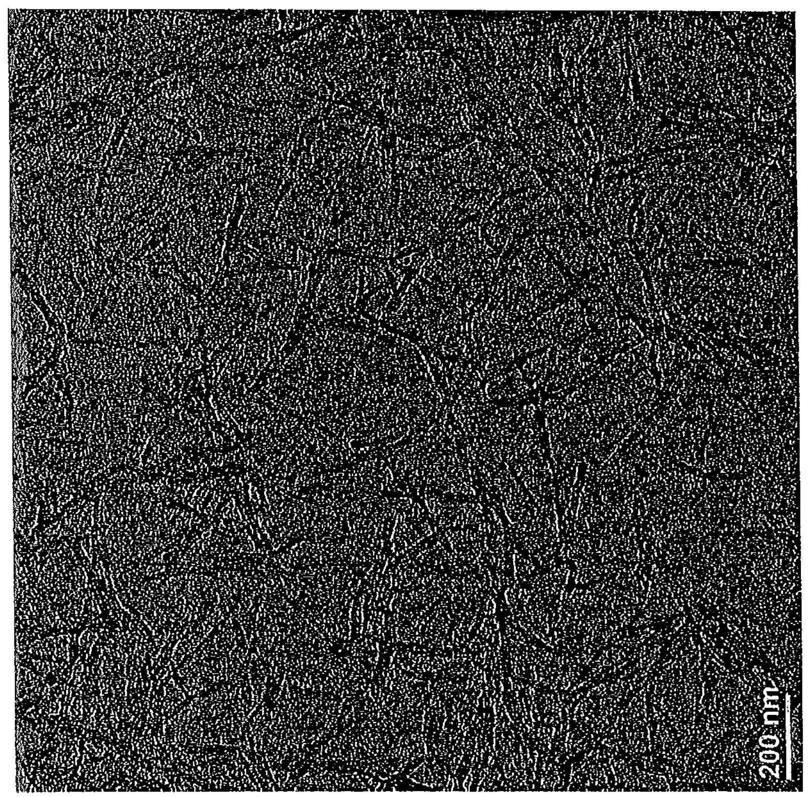
FIG. 5B shows a photomicrograph of cellulose nanocrystals (CNC).
Figure 6:
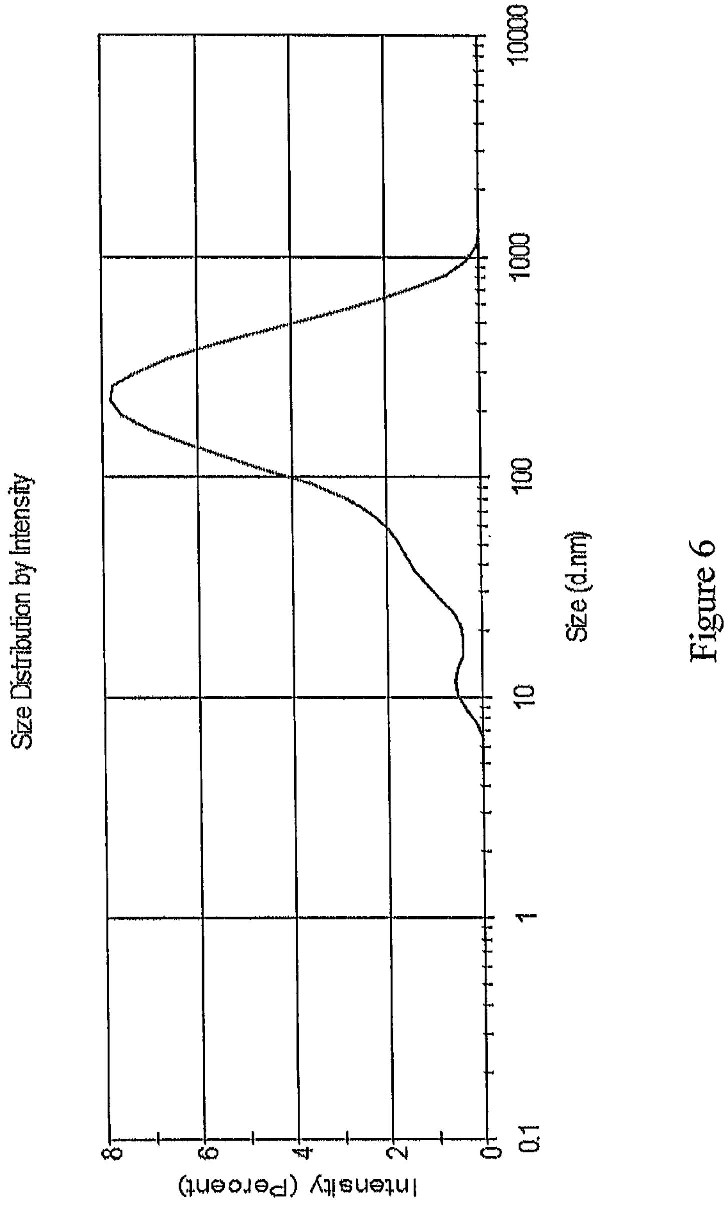
FIG. 6 shows the distribution of particle size of CNC, as measured by dynamic light scattering.
Figure 7:
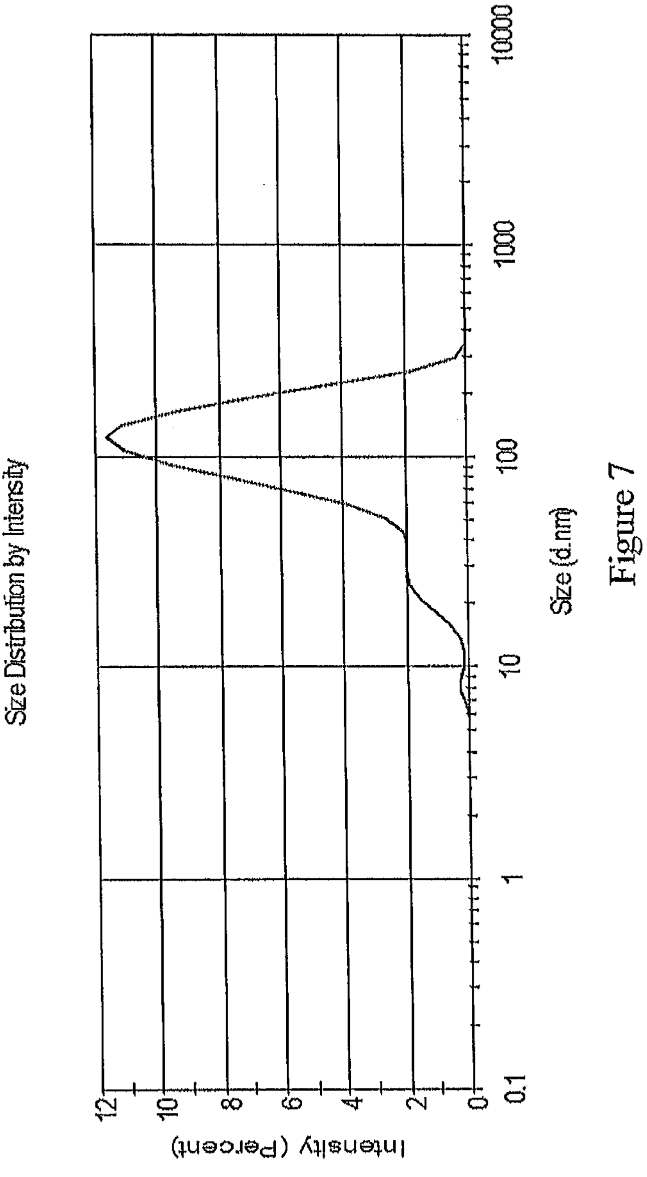
FIG. 7 shows the distribution of particle size of CNC after sonication, as measured by dynamic light scattering.

The resulting CNC appears to be uniform in size. As shown in FIG. 6, the average particle size is 212 nm from Trial #1. As shown in FIG. 7, the average particle size is 97 nm from Trial #4. A photomicrograph of the resulting CNC from Trial #7 is shown in FIG. 5B.

Alternatively, the CNCs in suspension resulting from the second redox reaction can be subjected to an alkaline wash, intended to further remove any residual organic acids.

Example 5—Thixotropy

Thixotropy or non-Newtonian behaviour is a property of high quality CNC suspensions with uniform size distribution. All samples showed thixotropic behaviour, indicating aspect ratios in the range of about 40 to 50.

Example 6—Multiple Additions of Oxidant

Figure 8:
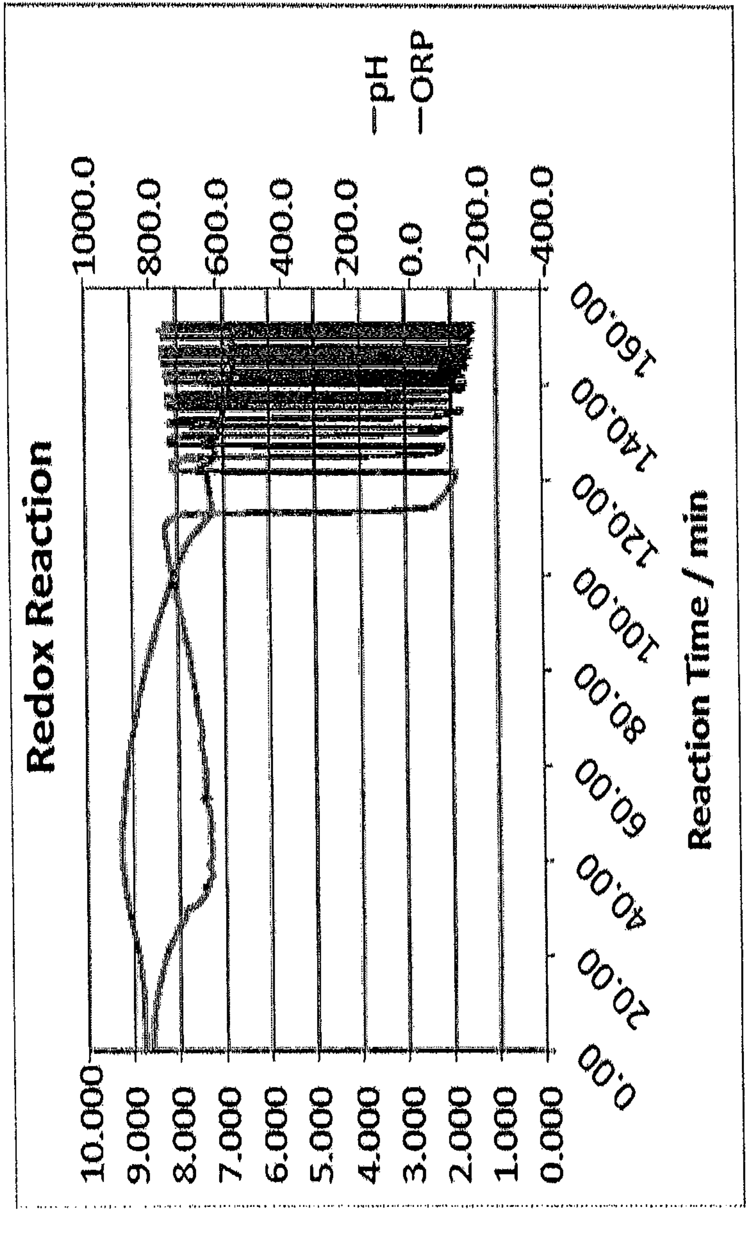
FIG. 8 shows a graph plotting pH and oxidation-reduction potential (ORP) during a redox reaction of the present invention, with multiple additions of hypochlorite.

In one example, crystalline cellulose was prepared from A96 cellulose with a single redox reaction, with additional dosing of hypochlorite towards the end of the reaction. In a total 1.0 L volume, with 10 g (dry weight) of A96, 120 ml of 12% NaOCl, 80 ml of buffer and 3.9 ml of copper catalyst. 60 ml of NaOCl was added with the initial mixture, followed by 12 additional 5 ml aliquots at each time the ORP dropped to about zero (see FIG. 8). The reaction temperature was 75° C.

TABLE 7

Reactant Ratios

| Ratios | Redox |
|---|---|
| Oxidant/Cu | 549.4 mol/mol |
| Oxidant/Biomass | 856.8 mg/g |
| Cu/Biomass | 1.33 mg/g |

Figure 9:
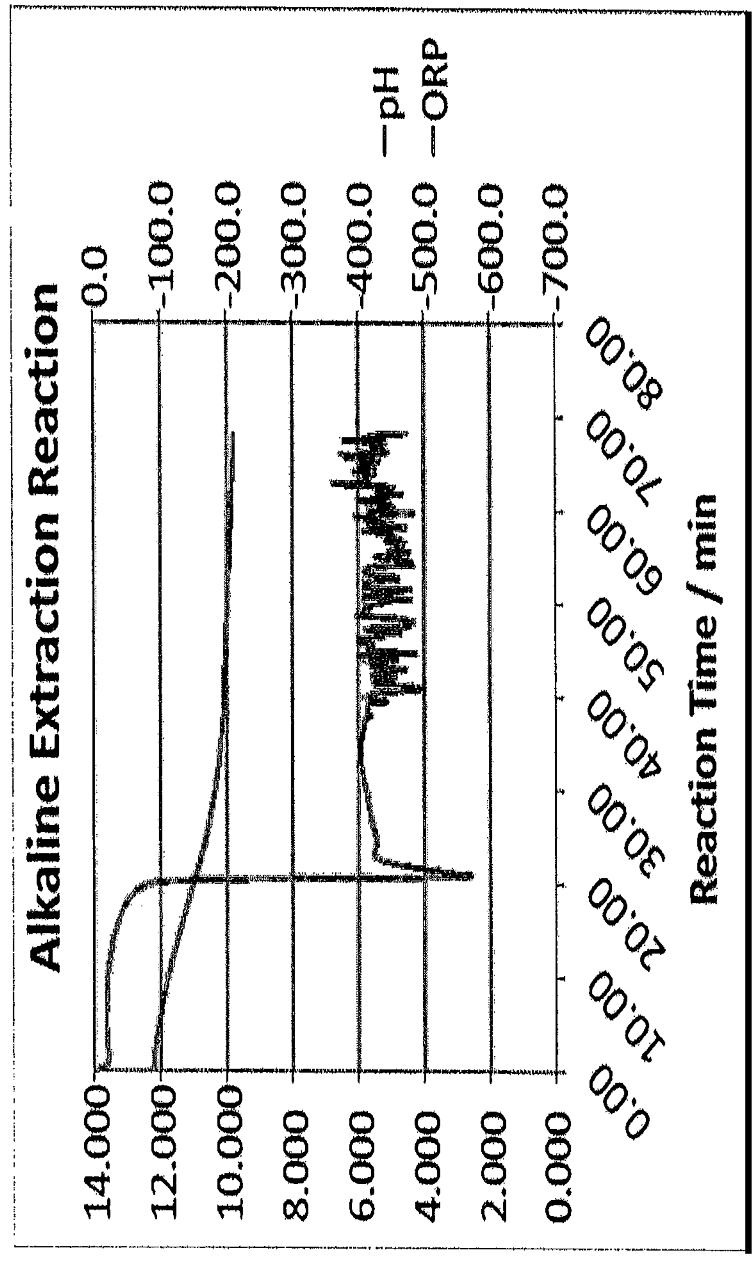
FIG. 9 shows a graph plotting pH and oxidation-reduction potential (ORP) during a alkaline extraction, after an initial redox reaction.
Figure 10:
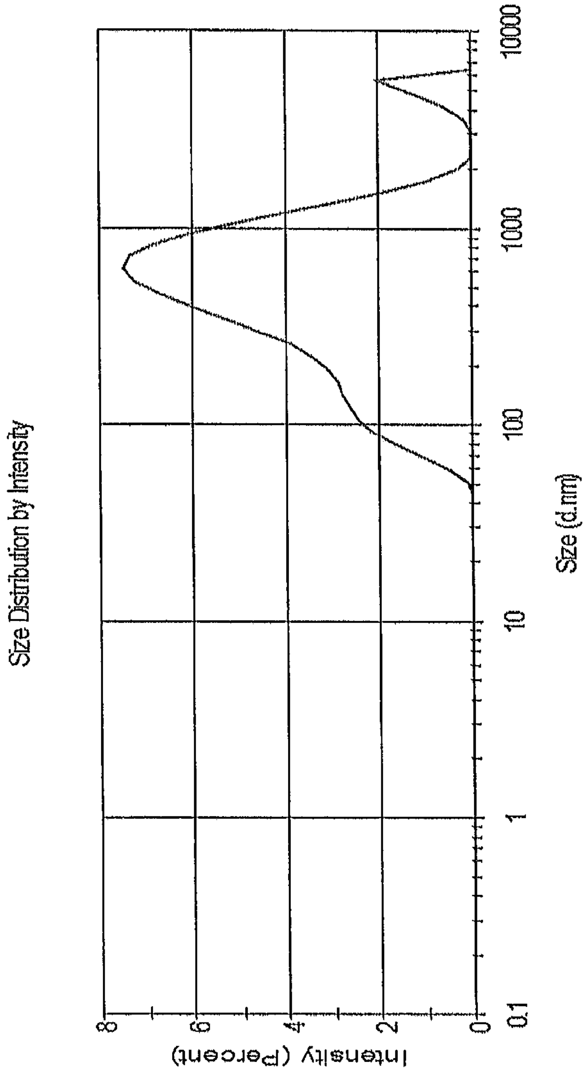
FIG. 10 shows the distribution of particle size of CNC and MCC, as measured by dynamic light scattering.

An alkaline extraction was performed as described above (see FIG. 9). The size distribution (FIG. 10) of the resulting product after alkaline extraction and 15 second sonication was a mixture of MCC as shown in the right hand peak of the size distribution graph, and CNC having an average particle size of about 347 nm (after sonication). The CNC was of reasonably uniform particle size distribution, as evidenced by the single peak below 1000 nm, although a portion had a particle size slightly above 1 micron.

This example shows that reasonable quality CNC may be produced with a single redox reaction with sequential addition of additional hypochlorite.

Example 7—Effect of Temperature

Figure 11:
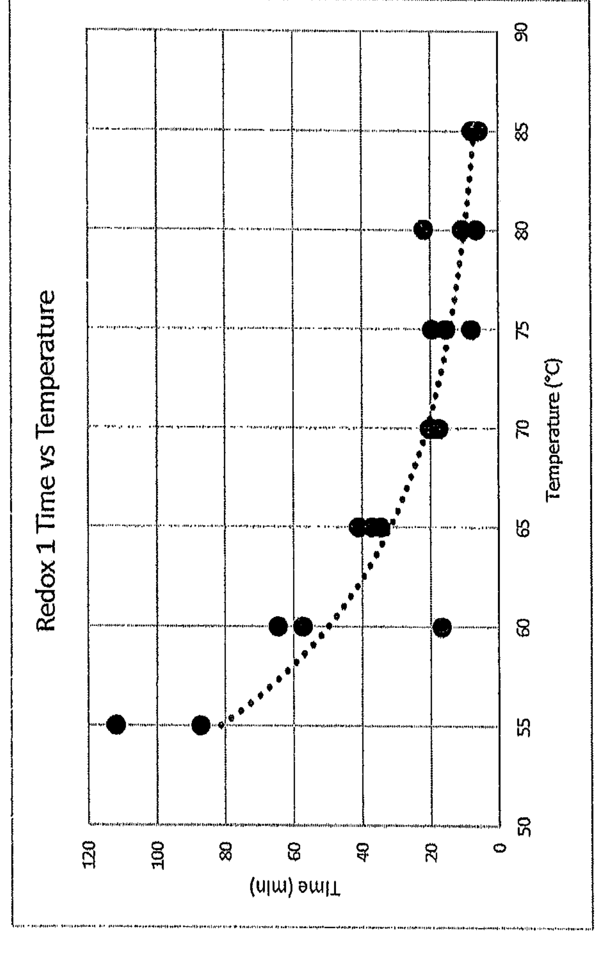
FIG. 11 shows a graph showing the relationship between temperature of a first redox reaction and time to completion.
Figure 12:
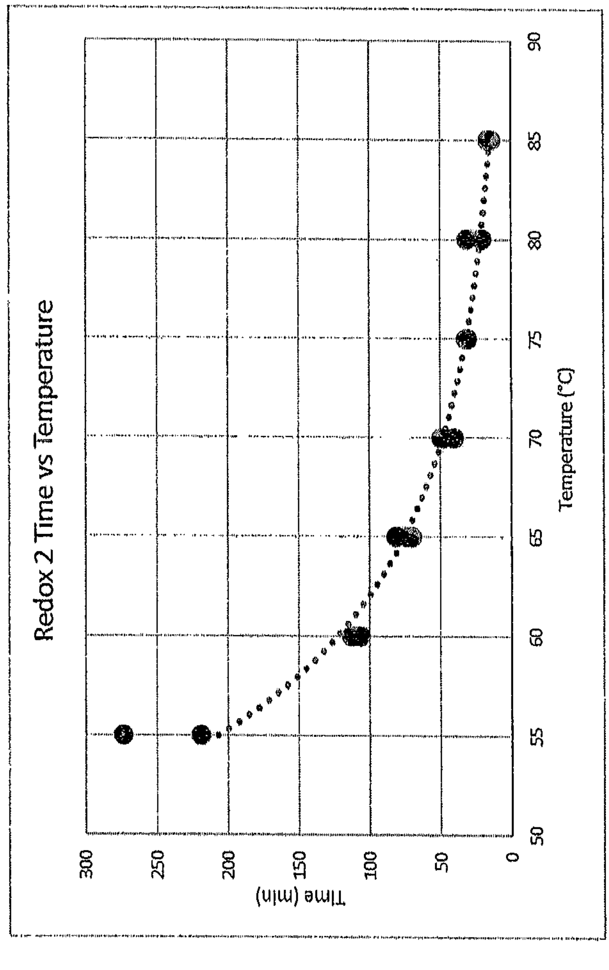
FIG. 12 shows a graph showing the relationship between temperature of a second redox reaction and time to completion.

All reactions were performed with 20 g A96, 8.9 g NaOCl, 40 mL of 0.625 M monosodium phosphate (MSP)/trisodium phosphate (TSP) buffer, and 52.3 mg copper sulfate pentahydrate, with an alkaline wash. The temperature of the first and second redox reactions was varied from 55° C. to 85° C. at 5° C. increments. Three trials were performed at each temperature. As shown in FIGS. 11 and 12, and in the following Table 8, reaction time decreased with increasing temperature. However, yield appears to decrease slightly with temperature. Size, carboxyl content, and zeta potential were relatively unaffected by temperature.

TABLE 8

Effect of reaction temperature on reaction time, yield and product quality.

| | First Reaction Time/min | | Second Reaction Time/min | | Yield/% | | Z Ave/nm | | Carboxyl | Zeta |
|---|---|---|---|---|---|---|---|---|---|---|
| Temp ° C. | Average | St Dev | Average | St Dev | Average | St Dev | Average | St Dev | Content mmol/g | Potential mV |
| 55 | 99.7 | 17.5 | 246.8 | 39.0 | 50.3 | 7.9 | 110.7 | | 0.305 | |
| 60 | 46.2 | 25.8 | 110.3 | 3.5 | 49.5 | 1.6 | 107.8 | 4.3 | 0.214 | −36.2 |
| 65 | 37.5 | 3.3 | 74.9 | 5.8 | 43.5 | 5.0 | 93.0 | 9.0 | | −34.3 |
| 70 | 19.0 | 1.4 | 44.3 | 6.9 | 45.9 | 0.7 | 177.1 | 33.6 | 0.275 | −30.6 |
| 75 | 14.3 | 5.8 | 30.3 | 1.1 | 38.7 | 2.7 | 104.3 | 46.9 | 0.273 | −33.0 |
| 80 | 12.9 | 7.9 | 20.2 | 0.2 | 41.0 | 6.7 | 127.0 | 74.1 | 0.284 | −39.8 |
| 85 | 6.9 | 1.0 | 12.5 | 2.4 | 37.0 | 2.5 | 86.8 | 14.1 | 0.333 | −32.0 |

The reaction rate appears to follow the Arrhenius equation:

$$k = Ae^{\frac{-E_a}{RT}}$$

Where k is the rate constant, A is the frequency factor, $E_a$ is the activation energy, R is the gas constant, T is the temperature in Kelvin.

When ln(1/time) is plotted versus 1/Temperature, the intercept of the line is ln A and the slope is $-E_a/R$. Both lines showed a good fit to this relation.

TABLE 9

| | $A/min^{-1}$ | $E_a$/J/mol | $r^2$ |
|---|---|---|---|
| First Reaction | 8.48E+10 | 1,168 | 0.969 |
| Second Reaction | 2.6426E+12 | 1,340 | 0.991 |

Example 8—Effect of pH Control

Reactions were performed at 75° C. with 20 g A96, 8.9 g NaOCl, and 52.3 mg copper sulfate pentahydrate. The buffers tested were Citrate/TSP, MSP/TSP, Phosphoric Acid/TSP, sodium hydroxide (NaOH) added continually, NaOH at the beginning, and no buffer. The continual addition of NaOH was done to keep the final pH about 7.0. It was found that the fastest reactions occurred with NaOH added continuously and no buffer. Yield, size, and carboxyl content are relatively unaffected by the different buffers. Reaction without pH control was as fast and yielded the same quality CNC as the pH controlled reaction. Although buffers may be used in the NaOCl reaction, they are not necessary for the reaction to occur.

TABLE 10

Effect of pH control on reaction time, yield and product quality.

| Buffer | Redox 1 Time (min) | Redox 2 Time (min) | Yield % | Zave nm | Carboxyl Content mmol/g | Zeta Potential mV |
|---|---|---|---|---|---|---|
| Citrate/TSP | 36.8 | 41.4 | 49.4 | 95.1 | 0.260 | — |
| None | 16.1 | 13.2 | 40.2 | 128.0 | 0.265 | — |
| NaOH increments | 7.3 | 16.4 | 38.9 | 90.1 | 0.286 | −39.0 |
| NaOH front loaded | 38.8 | 69.2 | 47.7 | 108.3 | 0.282 | — |
| MSP/TSP | 14.3 | 31.2 | 38.7 | 104.3 | 0.273 | −33.0 |
| TSP/Phosphoric Acid | 11.1 | 31 | 34.7 | 92.2 | 0.246 | — |

Example 9—Effect of Catalyst Variation

Two different standards were used to see the effect of different types and varying amounts of catalysts. Experiments were performed with no buffer, or NaOH added continuously to 20 g of A96 with 8.9 g NaOCl. The different types of catalyst tested were copper (II) sulfate pentahydrate, ferrous sulfate heptahydrate, manganese sulfate monohydrate, and no catalyst. 0.210 mmol of catalyst was added.

TABLE 11

Effect of catalyst type on reaction time, yield and product quality.

| | First Reaction Time/min | | Second Reaction Time/min | | Yield/% | | Z Ave/nm | | Carboxyl | Zeta |
|---|---|---|---|---|---|---|---|---|---|---|
| Catalyst | Average | Std Dev | Average | Std Dev | Average | Std Dev | Average | Std Dev | Content mmol/g | Potential mV |
| Copper | 16.1 | 9.7 | 13.2 | 4.9 | 40.2 | 2.3 | 128.0 | 13.5 | 0.266 | −31.0 |
| Iron | 21.2 | 3.0 | 36.7 | 10.8 | 31.1 | 1.4 | 244.7 | 36.1 | 0.269 | −33.6 |
| Manganese | 17.4 | 0.9 | 45.6 | 1.3 | 38.3 | 10.1 | 350.7 | 12.6 | 0.261 | −30.9 |
| No Catalyst | 104.2 | 41.0 | 109.3 | 6.9 | 56.4 | 5.7 | 251.0 | 4.9 | 0.235 | −31.2 |
| No catalyst EDTA Chelated | 62.8 | 10.8 | 78.9 | 19.9 | 72.95 | 4.6 | 729.0 | — | — | — |

To determine the effect of the amount of catalyst, the standard reactions were conducted with varying amounts of catalyst. The results are shown in Table 12. All three amounts of catalyst produced CNC, but the process was fastest when more was added. Yield, size, and carboxyl content were unaffected by the amount of catalyst. Both the no buffer and NaOH produced relatively the same quality of products.

TABLE 12

Effect of catalyst concentration on reaction time, yield and product quality.

| Copper Conc. mmol/L | First Reaction Time/min Avg | First Reaction Time/min St Dev | Second Reaction Time/min Avg | Second Reaction Time/min St Dev | Yield/% Avg | Yield/% St Dev | Zave/nm Avg | Zave/nm St Dev | Carboxyl Content mmol/g | Zeta Potential mV |
|---|---|---|---|---|---|---|---|---|---|---|
| 0.021 | 18.0 | 7.9 | 30.8 | 5.6 | 39.4 | 4.2 | 117.9 | 26.9 | 0.296 | −34.6 |
| 0.210 | 16.1 | 9.7 | 13.2 | 4.9 | 40.2 | 2.2 | 128.0 | 13.5 | 0.267 | −35.0 |
| 0.420 | 3.0 | 0.6 | 10.2 | 3.0 | 34.2 | 4.1 | 120.7 | 41.5 | 0.286 | −31.3 |

Example 10—Effect of Oxidant Loading

Different amounts of NaOCl were tested to find the minimum amount required for the reaction to effectively proceed and to determine the effect the amount of NaOCl has on the reaction. Each reaction was performed at 75° C. with 20 g A96, no buffer, and 0.210 mmol of copper sulfate pentahydrate. NaOCl was front loaded to the first and second redox at masses of 5.9 g, 7.4 g, 8.9 g, 11.9 g, and 14.9 g. 5.9 g NaOCl was not enough for the reaction to go to completion. As the amount of NaOCl increased, time required for the first redox decreased, time required for the second redox increased, yield decreased, and number of carboxyl groups increased. The difference in size and zeta potential was negligible.

When NaOCl was front loaded at 8.9 g to the first redox and 11.9 g and 14.9 g to the second redox, a similar pattern was observed. With more NaOCl, the more time the reaction required, the lower the yield, and the more carboxyl groups. The differences in size and zeta potential were also negligible for these tests.

In tests where a total of 8.9 g of NaOCl was added in 0.5 g increments after an initial dose of 4.5 g or 3.0 g added at the start of the reaction, similar results from the tests at 4.5 g NaOCl and 3.0 g were seen. The front-loaded tests and incremented tests were also relatively the same, indicating only the volume of NaOCl has an effect on the reaction, not the method of addition.

Example 11—Application to Different Biomasses

A standard reaction was performed with biomasses A96, TeMCC, V91, Hardwood Kraft, Softwood Kraft, and Yreka. 20 g of solids of each biomass was reacted at 75° C., without buffer, and 3.9 mL JS16. Results are shown in Table 13.

A96 is a high purity (96% alpha cellulose) and V91 (91% alpha cellulose) are high purity dissolving grade wood pulp produced at Neucel's Port Alice, BC mill. A96 is the raw material for the production of cellulose acetate. V91 is the raw material for the production of viscose.

TeMCC is the wood pulp that Tembec in Temiscaming, Quebec which is supplied to producers of MCC. It is also high purity (91% alpha cellulose).

The hardwood Kraft pulp is a typical Kraft pulp that was produced in Prince Albert, SK. The softwood Kraft pulp is a typical Kraft pulp that was produced in Prince Albert, SK. Kraft pulp tends to be lower in cellulose (85% alpha cellulose) but it is more plentiful and less expensive than dissolving pulp. The softwood wood source is Jack Pine, White Spruce and/or Black Spruce. The main difference between softwood and hardwood pulp is the length of the individual fibres. Softwood fibre length is approximately 2.5 mm, while hardwood fibre length is 0.70 mm. This difference causes softwood pulp to be much stronger than hardwood pulp. Softwood Kraft is used in printing and writing paper to increase its sheet strength, allowing for faster paper machine speeds and lighter weight paper.

Yreka comprises wood chips converted into medium density fibreboard by a high temperature refining of the chips. The resulting material is fibrous, but high in lignin. The cellulose content is the same as wood, or 40-45%.

Chempolis is straw fiber paper grade pulp produced by a formic acid pulping technology (Chempolis, Finland).

TABLE 13

| Oxidant requirement, yield and product quality for different biomass sources. | | | | | | |
|---|---|---|---|---|---|---|
| | NaOCl/biomass g/g | | | | Carboxyl | |
| Biomass | First Reaction | Second Oxidation | Yield | Zave | Content mmol/g | Zeta Potential mV |
| A96 | 0.37 | 0.37 | 38.8% | 173.0 | 0.216 | −30.6 |
| TeMCC | 0.65 | 0.43 | 32.6% | 95.0 | 0.280 | −34.9 |
| V91 | 0.65 | 0.43 | 34.2% | 151.0 | 0.232 | −31.2 |
| Hardwood Kraft | 0.65 | 0.65 | 26.3% | 159.4 | 0.324 | −44.5 |
| Softwood Kraft | 0.72 | 0.72 | 20.7% | 125.6 | 0.293 | −42.3 |
| Yreka MDF | 0.72 | 0.72 | 9.7% | 88.4 | | |
| Chempolis Wheat Straw | 0.65 | 0.65 | 27.7% | 109.0 | | |

The amount of NaOCl required for the biomass to produce CNC reflects the amount of lignin and waste product in the biomass. All of the biomasses required relatively the same amount of time for the reactions. A96, V91, and TeMCC had similar yields and size. Hardwood Kraft, Softwood Kraft, and Yreka had lower yields, likely because they required more NaOCl and started with more waste. The quality of Hardwood Kraft and Softwood Kraft was also lower than the other biomasses. The number of carboxyl groups and zeta potential reflected the amount of NaOCl added; large amounts of NaOCl resulted in a large number of carboxyl groups and very negative zeta potential. All of the biomasses tested produced acceptable CNC.

Example 12—Additional Tests and Findings

Additional tests were performed to provide more understanding and information for the patent. Another standard reaction was performed with tap water instead of reverse osmosis (RO) water. The original tests of temperature were done with buffer, so tests were performed to see how long the reaction would take without buffer at lower temperatures. The tests were performed with 20 g A96 at 60° C., 0.210 mmol of copper (II) sulfate pentahydrate, and 8.6 g NaOCl. The reactions at 60° C. showed similar results as with buffer, but at a greater speed.

TABLE 14

| Results of additional conditions testing. | | | | | |
|---|---|---|---|---|---|
| Reaction | Standard Reaction | No Wash | No Alkaline Extraction | Tap Water | 60° C. No Buffer |
| NaOCl Redox 1/g | 8.6 | 8.6 | 21.6 | 8.6 | 8.6 |
| Redox Time 1/min | 3.5 | 8.9 | 6.4 | 11.3 | 14.2 |
| NaOCl Redox 2/g | 8.6 | 8.6 | 21.6 | 8.6 | 8.6 |
| Redox Time 2/min | 7.4 | 9.4 | 7.3 | 18.0 | 45.2 |
| Yield/% | 38.3 | 46.2 | 28.9 | 55.5 | 46.0 |
| Zave/nm | 173.0 | 271.4 | 129.4 | 176.4 | 143.8 |

A typical reaction was performed without washing in between reactions to see if quality CNC could still be made. Table 15 shows that the yield and average particle size increased, suggesting a reaction that did not go to completion. It seems likely that oxidation products that are normally washed off of the biomass are competing with the biomass for oxidation. This likely limits the extent of the desired reaction. This may be overcome by adding more oxidant to the reaction.

A study was done to determine how much oxidant was required to generate CNC of the same quality as the original protocol if the first alkaline extraction step is omitted. The results show that it takes 2.5 times as much oxidant as the standard protocol, resulting in a 10% lower product yield.

The redox process preferably uses reverse osmosis water for dilution and wash water. The results shows that yield is increased and the reaction is slower when using tap water (City of Saskatoon). This reaction was successful as long as the final wash was with RO water and the final product was re-suspended in RO water. This suggests that washing may not be as efficient with tap water, or something in the tap water could be interfering with the catalyst or other reaction component.

In order to determine the effect of solids loading, an experiment was done with no added water. A96 was added directly to 12% sodium hypochlorite then heated. 83 g of A96 was treated in 250 mL of 12% sodium hypochlorite. 0.210 mmol of copper (II) sulfate pentahydrate was used in both redox reactions. Table 15 shows that the protocol generated crystalline cellulose, but not the same quality and yield as a process which uses lower solids loading and more dilute solution.

TABLE 15

| Results of high biomass loading on product quality. | |
|---|---|
| Measurement | Result |
| Redox 1 Time/min | 16.0 |
| Redox 1 final pH | 3.41 |
| Redox 2 Time/min | 25.2 |
| Redox 2 pH | 3.48 |
| Zave/nm | 660.2 |
| Yield/% | 54.5 |

Example 13—Effect of CNC on Slump and Required Superplasticizer

Tests were conducted to determine the effect of CNC on cement composition slump and required superplasticizer. Two types of CNC were used: (a) CNC produced by oxidation as described in Example 6 above (hereinafter referred to as "BGB"); and (b) CNC produced by sulfuric acid hydrolysis (hereinafter referred to as "FPL"). Batches of concrete were produced using an electric mixer.

| | | |
|---|---|---|
| Cement | 21 kg | Type GU (LaFarge GU/GUL) |
| Aggregate | 51.5 kg | 20 mm Washed Aggregate (Burnco) |
| Sand | 33.8 kg | Washed Sand (Burnco) |
| Air Entrainer | 12 mL | BASF MasterAir AE 90 |

-continued

| | | |
|---|---|---|
| Superplasticizer | 24 mL | BASF MasterGlenium 7700 (More was added to achieve a slump of 220 mm) |
| W/C ratio | 0.40 | |

Air entrainer, superplasticizer and total water addition was varied to produce a concrete with the target of 220 mm slump and 30 day compressive strength higher than 35 MPa. This mix was enough to make 24 4×8" cylinder molds for strength testing. The procedure is based on ASTM C685/C685M Standard below:

1. Add all aggregates to the mixer.
2. Add first 5 kg of the mixing water with air entrainer, mix for 1 minute.
3. Add all cement, then mix for 30 seconds.
4. In the next 30 seconds add the remaining mixing water and CNC.
5. 30 seconds after the second water and CNC are added, add first amount of superplasticizer while mixing.
6. Mix for 2 minutes.
7. Stop the mixer, wait for 3 minutes.
8. Mix for another 2 minutes and check the slump.
9. Add Glenium 7700 for a target slump of 220 mm (8.7")
10. Check slump again.
11. Fill the 24 molds.
12. After 24 hours, take the concrete samples out of the molds and store them until testing.

The samples were prepared following ASTM Standard C192/C192M Standard Practice for Making and Curing Concrete Test Specimens in the Laboratory.

Several batches were made and the slump was measured at least twice for each batch. The water to cement ratio was 0.40 for all batches. The target slump was 220 mm and the slump was increased by adding the superplasticizer, MasterGlenium 7700, manufactured and sold by BASF. BASF's data sheet on this product recommends addition rates from 130 to 975 mL/100 kg of cementitious materials.

Figure 13:
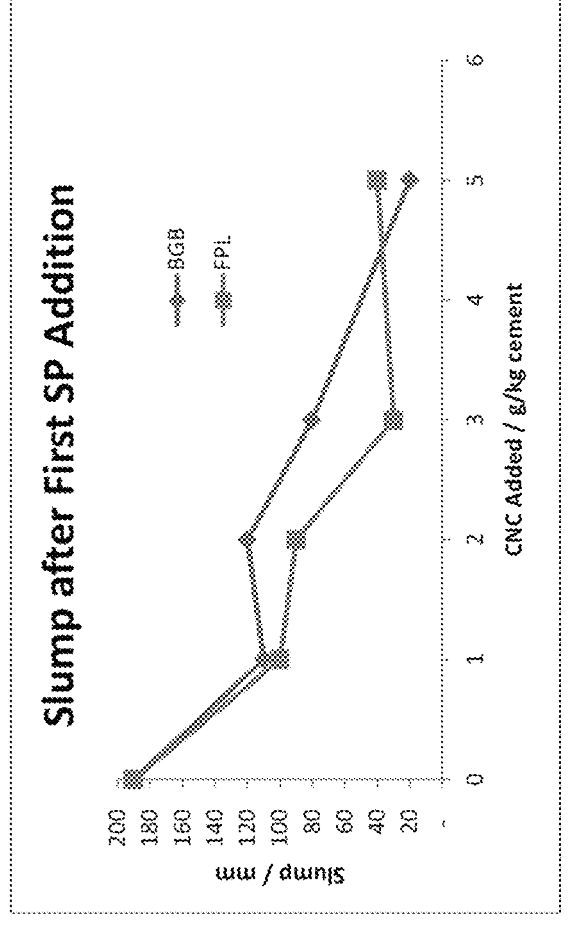
FIG. 13 shows a graph showing the effect of addition of the product on the initial slump.

The results, shown in FIG. 13, indicate that for both BGB and FPL CNC, increasing CNC content lowered the slump of the concrete. Without restriction to a theory, it is believed that the negatively charged CNC could be attracted to the positively charged components in the cement powder and this creates aggregates that therefore increase the apparent viscosity of the mix. Additionally or alternatively, the CNC may be binding water in the mix, therefore reducing the amount of water available for lubricating the concrete. In either case, the effect appears to be larger with FPL CNC than BGB.

Figure 14:
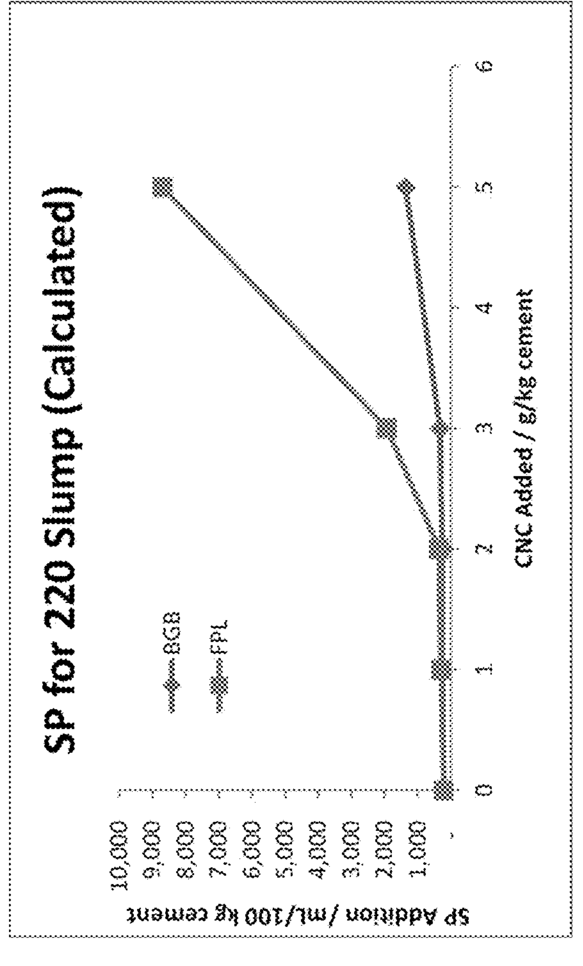
FIG. 14 shows a graph showing the required superplasticizer to achieve 220 mm slump after addition of the product.

FIG. 14 shows that at higher CNC addition levels, the amount of superplasticizer (SP) required to achieve 220 mm slump increases exponentially. This implies that the CNC is interfering with the function of the SP and this effect is much worse in FPL CNC. Table 16 shows the test data as well as the calculated results (italicized numbers exceed BASF's recommended dosage). These data show that for the purposes of mixing and placement, there is a noticeable and measureable difference between the two CNC sources.

TABLE 16

Test data of CNC addition on the amount of superplasticizer to achieve 220 mm of slump.

| CNC Addition/ g/kg | 1st Addition/ mL/100 kg cement | | First Slump/ mm | | 2nd Addition/ mL/100 kg cement | | Second Slump/ mm | | SP to 220 mL Slump | |
|---|---|---|---|---|---|---|---|---|---|---|
| Cement | BGB | FPL | BGB | FPL | BGB | FPL | BGB | FPL | BGB | FPL |
| 0 | 114 | 114 | 190 | 190 | 33 | 33 | 200 | 200 | 214 | 214 |
| 1 | 114 | 114 | 110 | 100 | 157 | 167 | 220 | 210 | 271 | 296 |
| 2 | 114 | 114 | 120 | 90 | 138 | 224 | 210 | 210 | 268 | 357 |
| 3 | 114 | 114 | 80 | 30 | 214 | 862 | 220 | 120 | 329 | *1,934* |
| 5 | 114 | 114 | 20 | 40 | 938 | 1,429 | 170 | 70 | *1,365* | *8,686* |

Example 14—Effect of CNC on Set Time

When CNC is introduced into a cement-water mixture, it is subjected to a highly alkaline environment. The pH of a cement-water mixture often exceeds 13 and this can strip material that has adhered to the CNCs. In the case of acid hydrolyzed CNC, this material may include monomers, dimers and oligomers of sugar that have been hydrolyzed in the reaction. In the case of oxidatively produced CNC, this material may include the oxidation products of these sugars, such as carboxylic acids. It is known that organic acids such as citric acid have cement set retarding properties.

Table 17 shows the initial set time (500 psi penetration resistance, ASTM C403) of cement pastes produced in the same proportions as the large batches described in Example 13. The relative proportions of cement, water, air entrainer (AE) and superplasticizer is the same, but there is no sand or aggregate added. Table 17 shows that the initial set time went from 305 minutes without CNC to 409 minutes with FPL CNC and 468 minutes with 1 g/kg of cement addition, or an increase of 34% with FPL and 53% with BGB.

A small batch of BGB was treated with a post-alkaline (PA) extraction to remove or neutralize carboxylic acids. pH was set to 12.0 and kept at 80° C. for 1.5 hours and then the sample was diafiltered and dewatered. It was intended to solubilize and separate carboxylic acids. Table 17 shows that the alkaline extraction decreased the set time from 468 minutes to 382 minutes, an 18% reduction. The FPL set time of 409 minutes shows that the treatment results in set time that is in the same range as FPL.

TABLE 17

Initial set time of cement pastes

| Test Condition | Initial Set Time/min |
|---|---|
| 0.36 Neat Paste | 289 |
| 0.36 Neat AE Only | 279 |
| No CNC, SP and AE added | 305 |
| 1 g BGB CNC, SP and AE added | 468 |
| 1 g CNC FPL, SP and AE added | 409 |
| 2 g CNC FPL, SP and AE added | 428 |
| 1 g CNC BGB 2nd Alkaline Extraction | 382 |

Example 15—Effect of CNC on Concrete Strength

Figure 15:
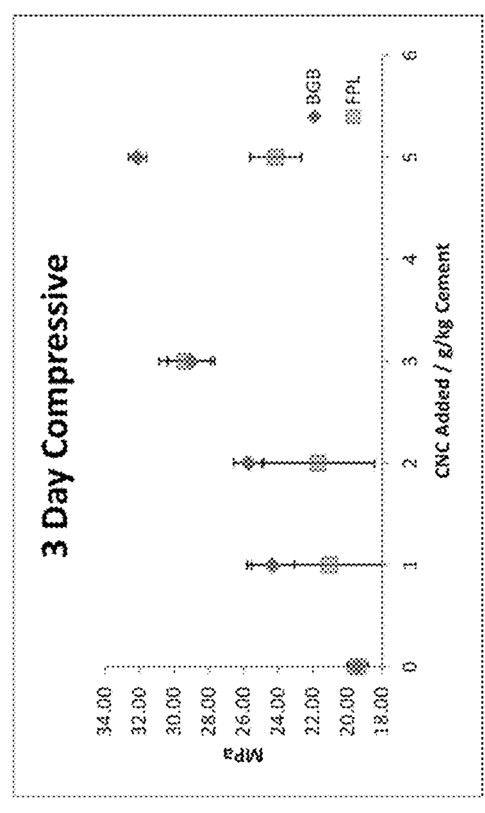
FIG. 15 shows the effect of CNC on concrete strength for water to cement ratio of 0.36.
Figure 15:
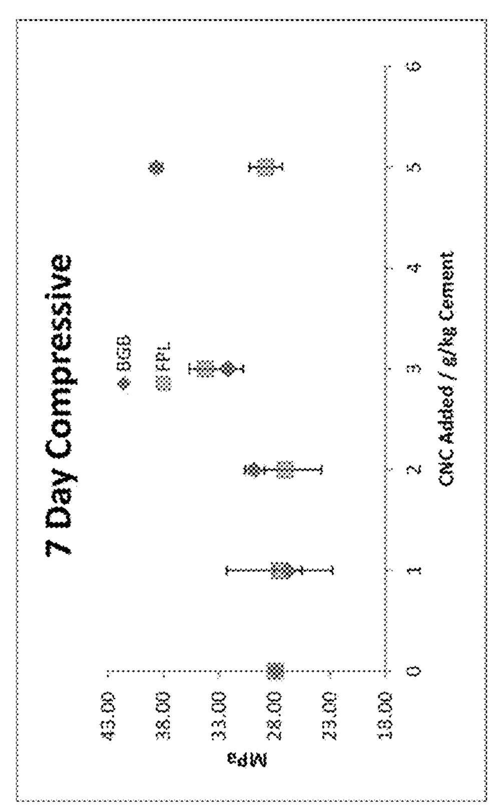
Figure 15:
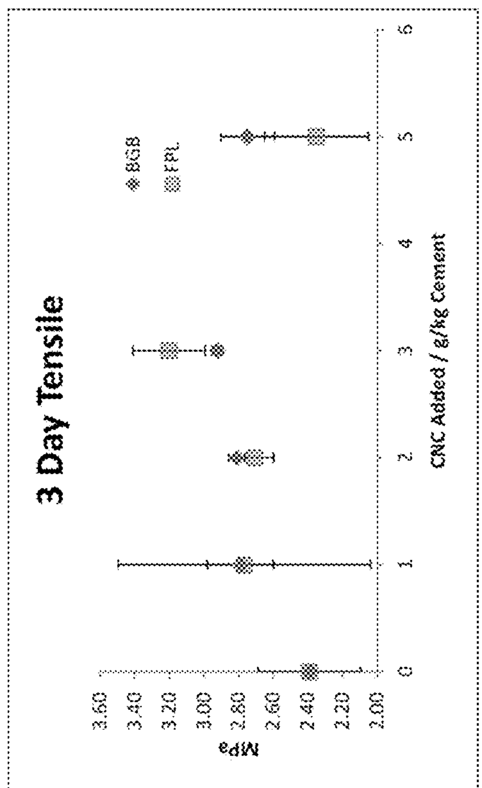
Figure 15:
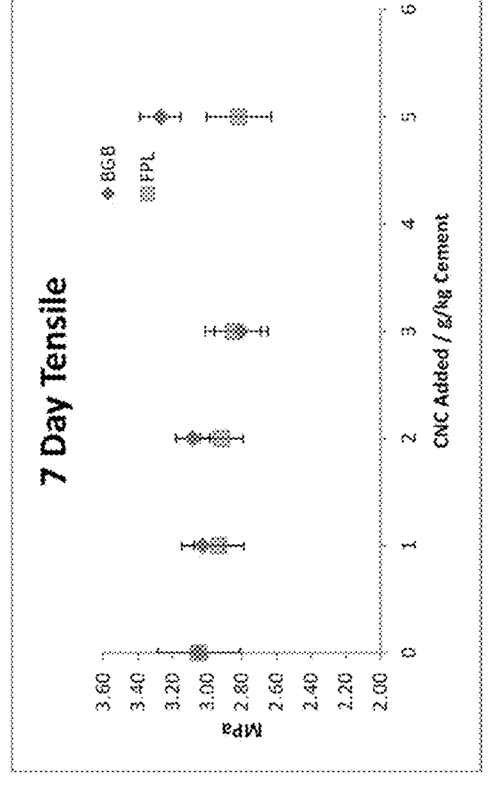

FIG. 15 shows large increases in 3 day strength, both with BGB and FPL. These increases appear to disappear after 7 days. Another observation was the weaker than expected tests from 5 g/kg of FPL CNC. Instead of increasing, the tensile and compressive strength decreased with increasing CNC addition. This may be due to the CNC effect on slump at high dosages. It may be that the low slump inhibits placement, causing entrapped air and areas where stress is concentrated.

Figure 16:
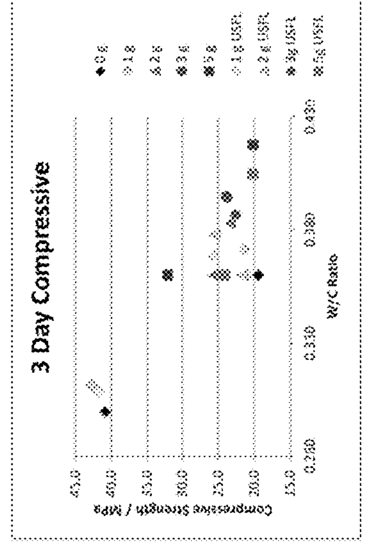
FIG. 16 shows the effect of increasing water to cement ratios on concrete strength.
Figure 16:
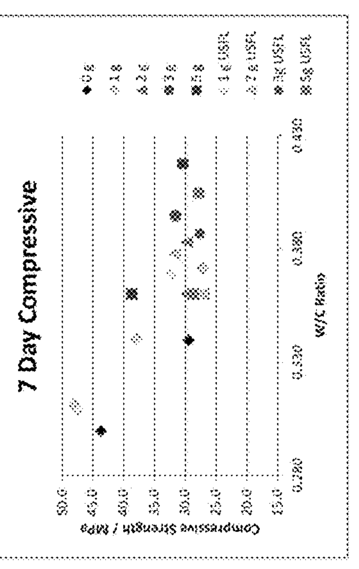
Figure 16:
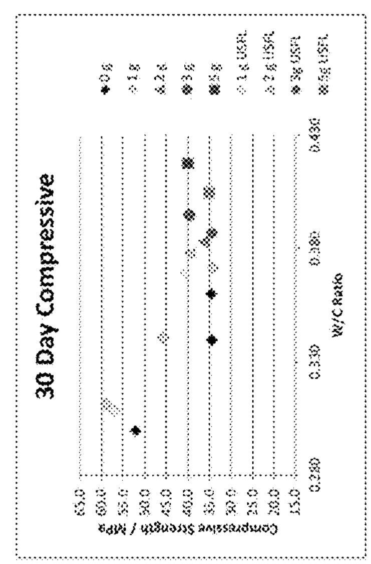
Figure 16:
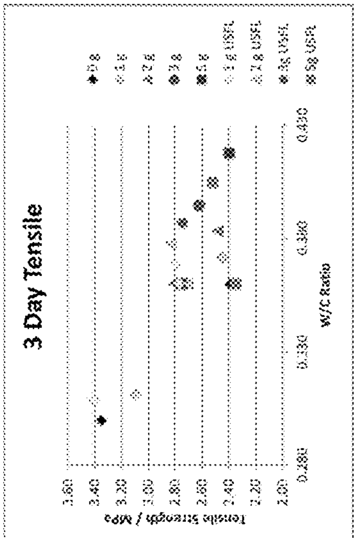
Figure 16:
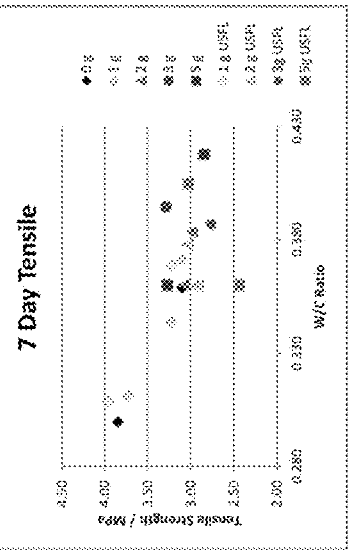
Figure 16:
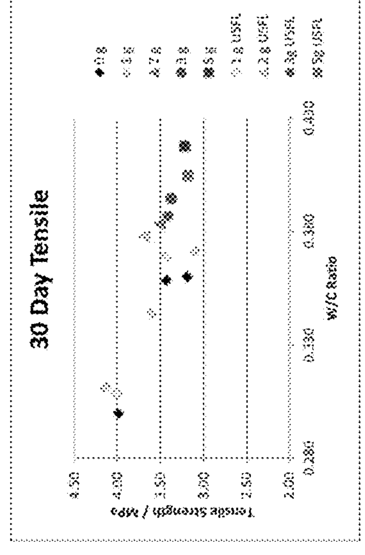

FIG. 16 (USFL is FPL) shows that equivalent strength performance can be achieved even with higher water to cement ratios, allowing for a reduction in the amount of cement powder in mixes, which would reduce cost and reduce greenhouse gas (GHG) intensity. The amount of GHG's ranges from 0.57 to 1.09 tonne C02/tonne cement with a typical value being 0.90. Since 5% of global GHG generation is from cement production, a 10-15% reduction in this would be very attractive to areas enforcing a GHG reduction program.

Example 16—Strength Test Up to 30 Days

Figure 18:
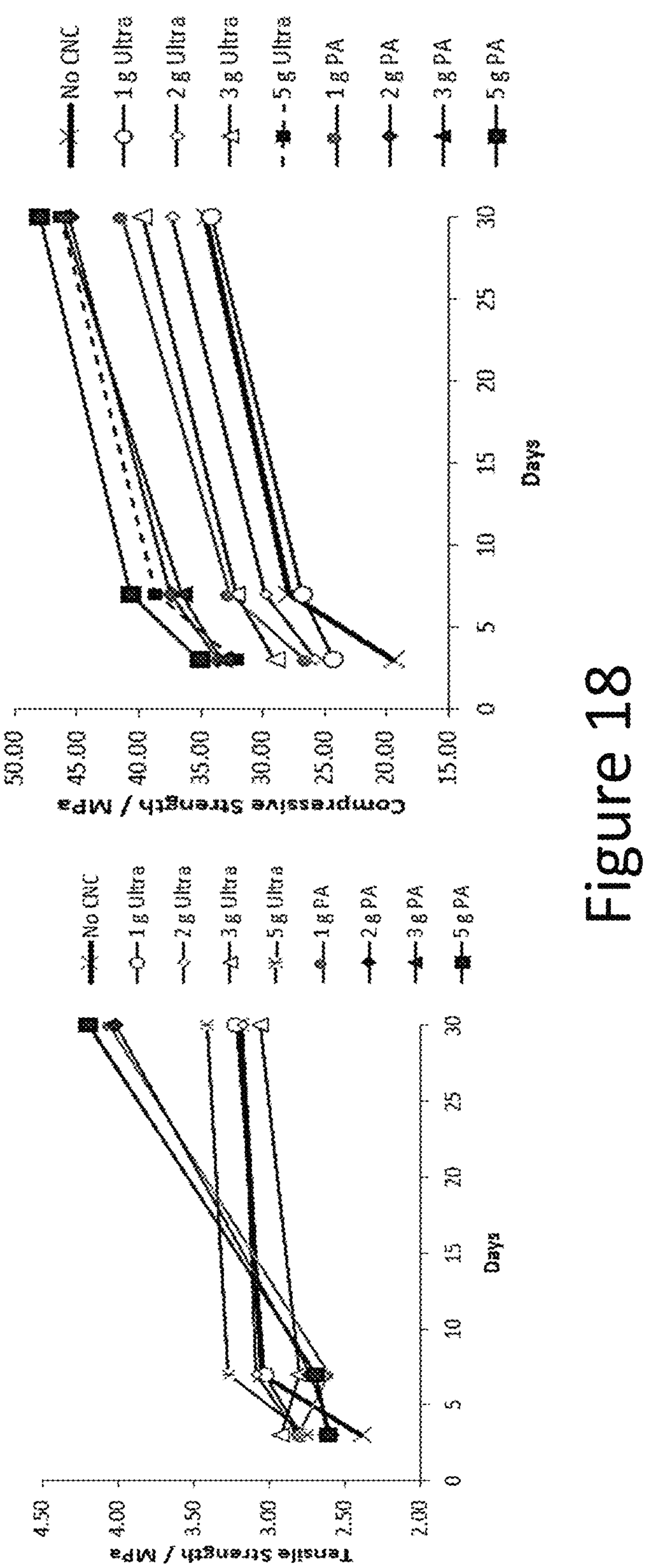
FIG. 18 shows tensile and compressive strength of CNC with an alkaline wash (PA) versus CNC without an alkaline wash.
Figure 19:
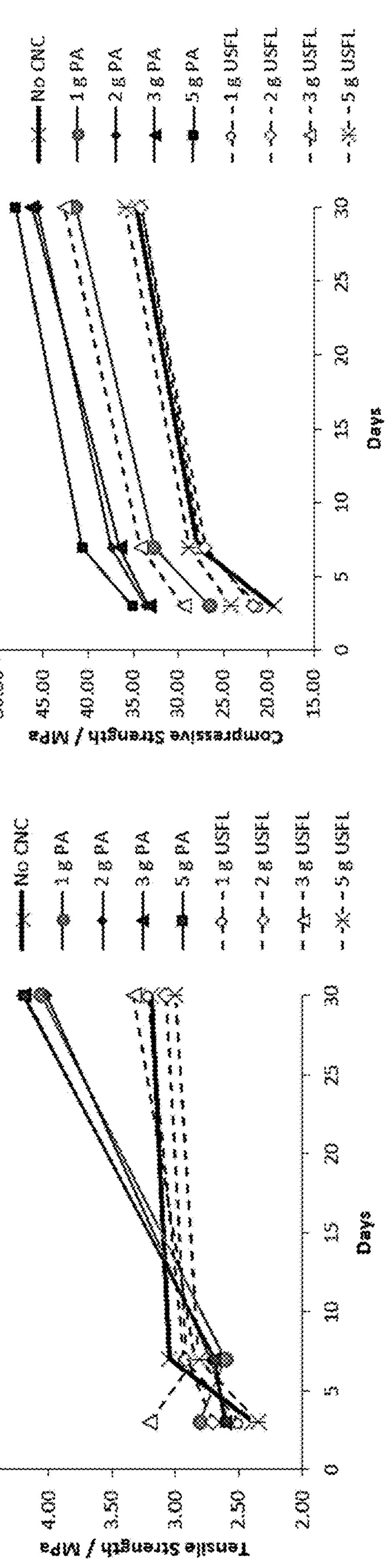
FIG. 19 shows tensile and compressive strength for PA CNC compared to CNC produced by acid hydrolysis (FPL).
Figure 19:
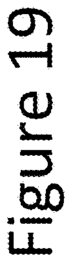

Cement compositions in accordance with Example 13 above were prepared without CNC, with BGB, and various loadings of BGB treated with a post-alkaline (PA) wash. The results are shown in FIGS. 17-19.

Figure 17:
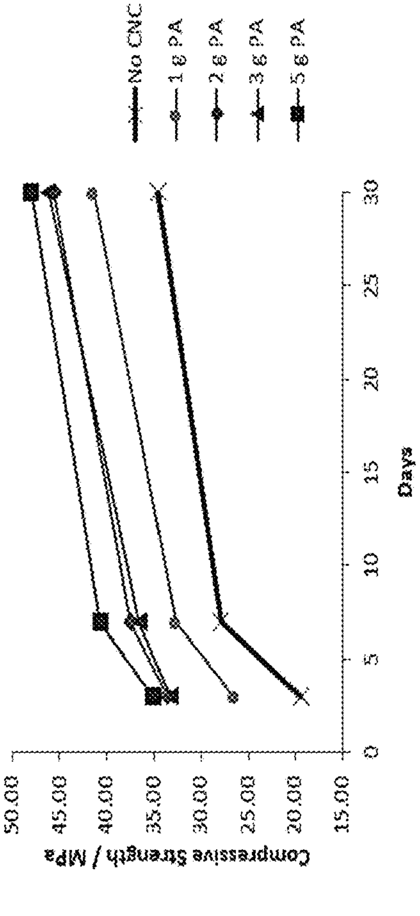
FIG. 17 shows tensile and compressive strength of CNC cement versus no CNC.
Figure 17:
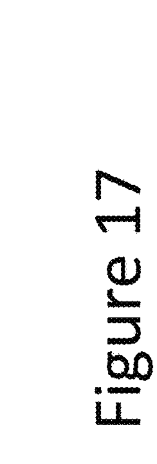

As expected, as shown in FIG. 17, PA CNC at all levels (1-5 g/kg) resulted in marked increases in tensile and compressive strength after 30 days, versus no CNC. However, as shown in FIG. 18, PA CNC at all levels (1-5 g/kg) resulted in marked increases in tensile and compressive strength after 30 days, versus BGB (non-post-alkaline treated) at the same loadings. As shown in FIG. 19, PA CNC at all levels (1-5 g/kg) resulted in marked increases in tensile and compressive strength after 30 days, versus FPL at the same loadings (Ultra is BGB Ultra).

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to “one embodiment”, “an embodiment”, etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as “solely,” “only,” and the like, in connection with the recitation of claim elements or use of a “negative” limitation. The terms “preferably,” “preferred,” “prefer,” “optionally,” “may,” and similar terms are used to indicate that an item, condition or step being referred to is an optional (not required) feature of the invention.

The singular forms “a,” “an,” and “the” include the plural reference unless the context clearly dictates otherwise. The term “and/or” means any one of the items, any combination of the items, or all of the items with which this term is associated.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

The invention claimed is:

1. A cement composition comprising cement and substantially pure cellulose nanocrystals (CNCs) formed by a redox reaction and having a carboxyl content of about 152 mmol/kg or less.

2. The composition of claim 1, wherein the CNC is substantially free of all mono, di- and oligosaccharides.

3. The composition of claim 1, wherein the carboxyl content on the surface of the CNC is measurable by conductimetric titration.

4. The composition of claim 1, wherein the redox reaction comprises oxidation with an inorganic persulfate, a hypohalite or hydrogen peroxide.

5. The composition of claim 4, wherein the redox reaction comprises the steps of:

(a) reacting a cellulosic material in an aqueous slurry comprising a transition metal catalyst and a hypohalite solution having an initial pH greater than about 6.0 and a final pH less than about 9.0; and (b) recovering a crystalline cellulose fraction.

6. The composition of claim 5, wherein the reaction of step (a) is continued or repeated until the appearance of crystalline cellulose is observed.

7. The composition of claim 6, wherein the CNCs are collected and treated with an alkaline solution to neutralize surface acid groups and reduce carboxyl content.

8. The composition of claim 7, wherein the alkaline solution comprises a solution of NaOH having a pH of about 12.0.

9. The composition of claim 7, wherein the alkaline solution is heated to between about 30° C. and about 90° C. to treat the CNC.

10. The composition of claim 1, comprising aggregate, an air entrainer and a superplasticizer.

11. A cement composition comprising cement and crystalline cellulose which has been treated with an alkaline solution to reduce its carboxyl content to about 152 mmol/kg or less.

12. The composition of claim 11, wherein the alkaline solution comprises a solution of NaOH having a pH of about 12.0.

13. The composition of claim 12, wherein the alkaline solution is heated to between about 30° C. and 90° C. to treat the crystalline cellulose.

14. The composition of claim 11, wherein the crystalline cellulose comprises nanocrystalline cellulose.

15. The composition of one of claim 11, wherein the crystalline cellulose is produced by a redox reaction.

16. The composition of claim 15, wherein the redox reaction comprises an oxidation step using an inorganic persulfate, a hypohalite or hydrogen peroxide.

17. A method of forming a cement composition, comprising the steps of:

(a) producing crystalline cellulose nanocrystals (CNCs), having a carboxyl content of about 152 mmol/kg or less, by oxidizing a cellulosic material; and (b) mixing the CNCs with cement.

* * * * *